United States Patent
Akhmedov et al.

(10) Patent No.: US 12,361,108 B1
(45) Date of Patent: Jul. 15, 2025

(54) DUAL EMBEDDING INDEX SYSTEM FOR IDENTIFY VERIFICATION

(71) Applicant: Raritex Trade Ltd., Strovolos (CY)

(72) Inventors: Sanjar Akhmedov, Berlin (DE); Sergei Travin, Berlin (DE)

(73) Assignee: Raritex Trade Ltd., Strovolos (CY)

( * ) Notice: Subject to any disclaimer, the term of this patent is extended or adjusted under 35 U.S.C. 154(b) by 0 days.

(21) Appl. No.: 18/981,000

(22) Filed: Dec. 13, 2024

(51) Int. Cl.
| | |
|---|---|
| *G06F 7/04* | (2006.01) |
| *G06F 16/51* | (2019.01) |
| *G06F 16/56* | (2019.01) |
| *G06F 21/32* | (2013.01) |
| *G06F 21/56* | (2013.01) |

(52) U.S. Cl.
CPC .............. *G06F 21/32* (2013.01); *G06F 16/51* (2019.01); *G06F 16/56* (2019.01); *G06F 21/566* (2013.01); *G06F 2221/034* (2013.01)

(58) Field of Classification Search
CPC .. G06F 21/32; G06F 21/566; G06F 2221/034; H04L 9/0866; H04L 9/3231; H04L 63/0861
See application file for complete search history.

(56) References Cited

U.S. PATENT DOCUMENTS

| | | | | |
|---|---|---|---|---|
| 11,354,936 B1 * | 6/2022 | Chandarana | ......... | G06V 40/172 |
| 11,625,947 B1 * | 4/2023 | Aggarwal | .......... | G06V 40/1318 382/124 |
| 2021/0209248 A1 * | 7/2021 | Feuz | ...................... | G06N 20/00 |
| 2023/0057547 A1 * | 2/2023 | Shah | ................... | G06F 21/6254 |
| 2023/0368575 A1 * | 11/2023 | Chen | ..................... | G06F 18/253 |
| 2024/0185635 A1 * | 6/2024 | Kolla | .................. | G06V 40/171 |

OTHER PUBLICATIONS

Kumar et al, Facial Expression Recognition Using Wavelet and K-nearest Neighbor, IEEE, Jul. 8, 2014, pp. 1-5. (Year: 2014).*
Singh et al, Analyzing Embedding Models for Embedding Vectors in Vector Databases, IEEE, Dec. 9, 2023. (Year: 2023).*

* cited by examiner

*Primary Examiner* — Philip J Chea
*Assistant Examiner* — Jenise E Jackson
(74) *Attorney, Agent, or Firm* — Schwegman Lundberg & Woessner, P.A.

(57) ABSTRACT

Described is a system for identity fraud detection by receiving an image of a user for an identity verification process of the user; generating a vector embedding for a face within the image using a machine learning model, comparing the vector embedding with at least two embedding repositories to determine a likelihood of fraud by: comparing the vector embedding with a first index of embeddings, the first index being updated at a first time interval; comparing the vector embedding with a second index of embeddings, the second index being updated at a second time interval, the first index and second index having at least a subset of the same points in the multidimensional space; and determining a characteristic of potential fraud based on the comparison of the vector embeddings with the first index and second index; and outputting an identity verification result based on the likelihood of fraud.

25 Claims, 9 Drawing Sheets

DUAL EMBEDDING INDEX SYSTEM FOR IDENTIFY VERIFICATION

TECHNICAL FIELD

The present disclosure relates generally to dual embedding, and more specifically to a dual embedding index system for identity verification.

BACKGROUND

Identity verification is the process of confirming that an individual is who they claim to be, typically by comparing provided information or credentials with established records or standards. It is widely used across various industries, including finance, healthcare, and digital services, to ensure secure access and prevent unauthorized activities.

Common methods of identity verification include physical document review, biometric recognition (such as facial, fingerprint, or iris scans), and knowledge-based authentication (e.g., security questions). In digital settings, identity verification can process and analyze user-provided data, such as photos of government-issued IDs and selfies, and match them against known records for accuracy and reliability. These processes are critical for maintaining trust and security in both physical and digital environments.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
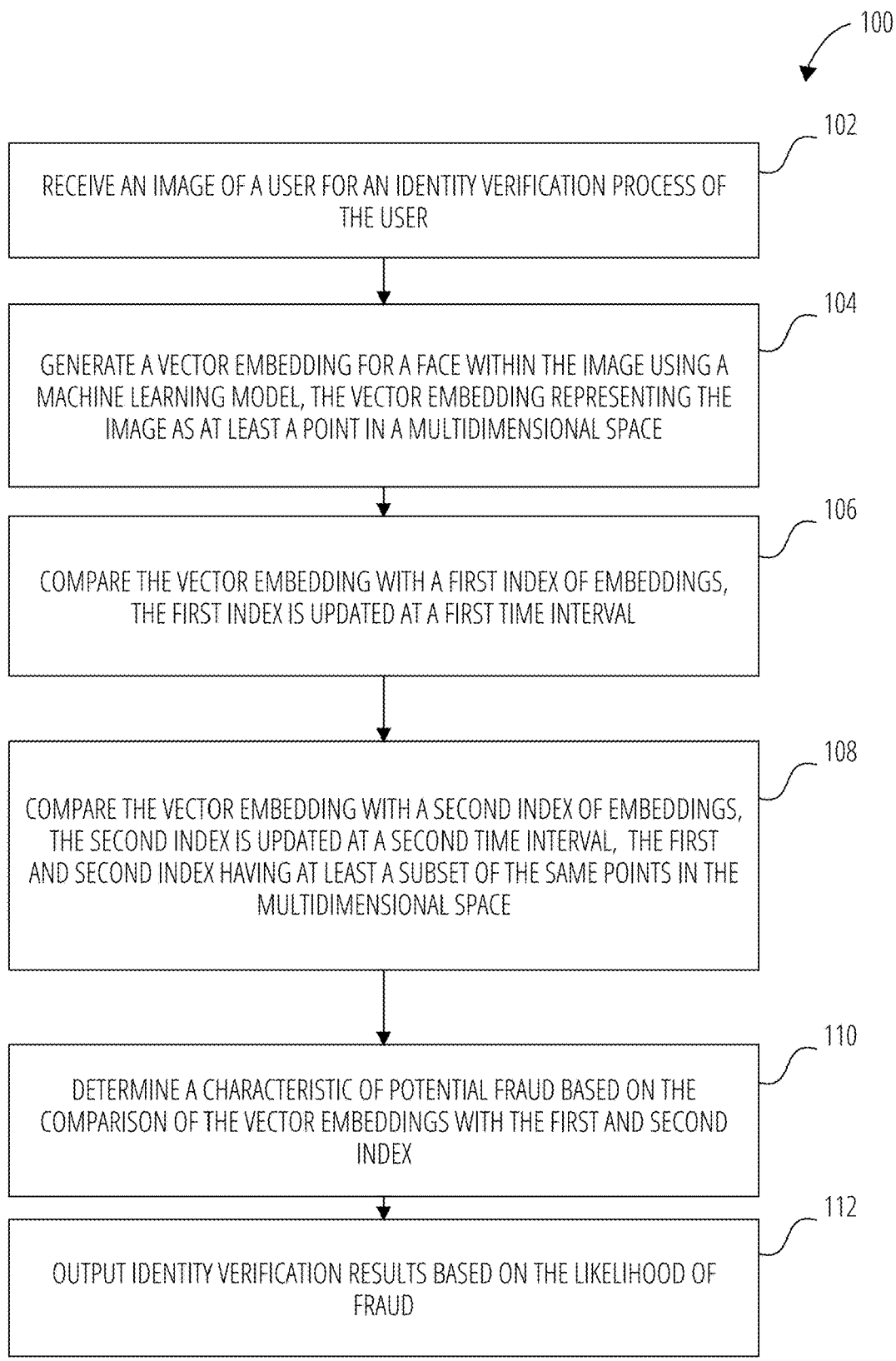
FIG. 1 illustrates an example method for identify verification using a dual embedding index process, according to some examples.

Traditional systems for managing and analyzing data often face significant deficiencies in terms of scalability, efficiency, and accuracy when dealing with large and dynamic datasets. These limitations arise due to the rigid and resource-intensive approaches commonly employed in such systems. Limitations of these systems become apparent, in particular, in identity verification and fraud detection workflow due to the large scale of data that needs to be stored and analyzed.

Traditional systems often store all data in a single database or structure without differentiating between recent and historical data, or between embeddings and non-embedding data. This approach leads to overloading of resources. As the dataset grows over time, the system's ability to perform timely comparisons degrades. Historical data that is rarely relevant to real-time decisions is repeatedly analyzed, adding unnecessary overhead. The system becomes less capable of handling increases in user activity or data volume as both recent and historical data are treated equally.

Without clear distinctions between short-term and long-term data needs, traditional systems lack the flexibility to prioritize recent data or implement optimized retention strategies. This leads to excessive retention of outdated data, which contributes to resource inefficiency, and missed opportunities to focus on recent activity that is more relevant to immediate fraud detection scenarios.

A vector embedding is a technology of encoding various types of data using a machine learning model trained to generate representation of a certain type or certain types of data or features of said data as a numerical or alphanumerical representation of coordinates of a point in a multidimensional space. More similar data objects encoded by the same machine learning model shall be represented as points in multidimensional space located closer to each other compared to points corresponding to less similar objects.

In particular, but not limited, a machine learning model may be trained to encode text, numbers, audio, image data, such as videos or static images, biological or biometrical data, geospatial data, time data. A machine learning model may be trained to encode multimodal data such as documents containing various types of media. In some embodiments the various types of media may include, text, numbers and images.

A machine learning model may be trained to encode or user profiles or user verification requests comprising personal data, client data or biometrical data such as users' images. A machine learning model may be trained to encode behavioral data, such as user activities or transactions. In some implementations a machine learning model may be trained to encode specific types of image data, in particular image data depicting humans, human faces and the location where the image data has been recorded. In that case vector embeddings encoding image data depicting similar faces or the face of the same person will be more similar than vector embeddings encoding image data depicting different faces.

A vector database is a specialized database system optimized for storing, indexing, and retrieving vector embeddings as representation of points in a multidimensional space. A vector database is specialized for similarity search and nearest neighbor search (e.g., finding vectors closest to a given query vector using metrics like cosine similarity or Euclidean distance), which provides for the ability to search and retrieve non-structured data. Vector databases provide indexing techniques like hashing, quantization, and graph-based methods to enable fast querying and similarity searches.

Vector databases are known to be computationally costly. Vector databases handle high-dimensional data, which significantly increases the computational cost of operations like similarity search. The cost of each operation depends on the number of the database records and the number of dimensions. As any of the numbers increases, the discriminative power of similarity metrics (e.g., cosine similarity, Euclidean distance) decreases, necessitating additional computations like dimensionality reduction or advanced similarity functions, which further add to processing time.

A vector database may be enabled to store non-vector data. The non-vector data may be associated with the vector embeddings stored in the vector database (metadata). Adding metadata to a vector database introduces enables more precise queries and filtering of data but additionally increases computational cost in terms of preprocessing overhead for filtering and ranking, storage and indexing requirements for managing metadata efficiently, latency and resource usage during query execution, particularly for complex filtering or ranking operations. If metadata is added in addition to embeddings, known vector databases are able to efficiently process up to tens of millions records, after which computational efficiency starts to rapidly decline. The exact number of records that can be efficiently processed depends on the processor's computational capacity and the amount of metadata.

A non-vector (or conventional) database is a conventional database system, including relational databases (e.g., SQL-based systems) and NoSQL databases, which is designed primarily to store and query structured or semi-structured data (e.g., tables with rows and columns, key-value pairs, or document-based formats). A non-vector database may store a vector embedding as a simple string or several strings of numbers or alphanumerical symbols. A non-vector database is efficient for storing and retrieving non-vector data at a large scale (billions of non-vector data records), but is not designed or optimized to conduct similarity searches within stored embeddings in the way a vector database is designed to do.

Fraud detection systems relying on static data structures or predefined rules often struggle to adapt to emerging fraud patterns, such as coordinated attacks or sophisticated techniques like synthetic identity fraud. This limitation arises because they lack mechanisms to prioritize critical data (e.g., recent fraud signals) or identify evolving patterns in a timely manner. Traditional approaches cannot dynamically adjust data processing strategies based on current system needs or fraud trends.

Traditional systems typically perform exhaustive comparisons across all stored data, whether relevant or not, leading to significant computational overhead by processing all embeddings for every request without differentiation drains system resources, and increased latency causing slower responses to user verification requests that can impact user experience and system efficiency.

Vector Embedding Search Using Double Database System

The indexing system described herein mitigates or eliminates the deficiencies of traditional systems. Unlike traditional systems that store all data in a single structure, the indexing system can divide data between a vector and non-vector databases to leverage advantages of both systems. The vector embeddings may be stored in a vector database optimized for similarity search alongside with references to the metadata recorded in the non-vector database. The metadata is stored in the non-vector database alongside references to the corresponding vector embeddings stored in the vector database. This approach provides for the ability to conduct similarity searches within the vector embeddings while simultaneously enabling filtering and grouping of the query results on the basis of metadata stored in the non-vector database. This approach reduces the amount of data stored at the computationally intensive vector database, therefore, reducing computational overhead. In some embodiments the vector data may be divided to more than one vector database and/or the metadata can be divided to more than one non-vector database.

The non-vector database stores the metadata associated with certain vector embedding and database record reference token corresponding to said metadata. The database record reference token could be an alphanumeric designation of one or several related database records.

The vector embedding and database record reference token are logged in an index of a vector database. In some implementations, logging is performed using an event logging and stream-processing module. In some implementations the index logs all vector embeddings and database record reference tokens recorded in the non-vector database. In some implementations the index is continuously updated in real time. In some implementations, the index contains a limited number of vector embeddings and database record reference tokens. The index could be limited by time (all records not earlier than X days) and/or by the number of indexed records (the most recent Y records). In some implementations the index is continuously updated in real time. In some implementations the index is updated with predefined periodicity.

The indexing system may be used for optimized vector embedding search and retrieval of associated metadata. In response to a request to search for embeddings similar to a query embedding, the system performs nearest neighbor search (e.g., finding vectors closest to a given query vector using metrics like cosine similarity or Euclidean distance) and returns a group of most similar vector embeddings and associated database record reference tokens. The system then returns metadata stored in the non-vector database and associated with the output vector embeddings on the basis of database record reference tokens. The query results could then be filtered on the basis of metadata.

According to conducted tests the separation of metadata and vector data provides for a significant improvement (e.g., at least tenfold increase) in scale of the data that can be efficiently processed with the same volume of metadata and the same computational power.

Vector Embedding Search Using Double Indexing Process

Additionally the indexing system can divide the vector data between at least a first index (for recent data) and a second index (for historical data). This separation resolves issues of resource overload by optimizing real-time processing. The first index is updated in real time and stores only the most recent embeddings (e.g., a week's worth of data), ensuring timely comparisons for immediate fraud detection. This approach prevents the system from analyzing older, less relevant embeddings during real-time verification, reducing computational overhead.

The second index is generally designed to store more historical embeddings than the first index and/or all historical embeddings, providing a long-term repository for detecting patterns or trends spanning weeks, months, or years, albeit there may be some circumstances where this is not true (e.g., when both indexes are empty). By ensuring that recent and historical data are stored and processed separately, the system reduces resource strain, avoids redundant computations, and improves scalability as the dataset grows.

The indexing system introduces clear distinctions between short-term and long-term data needs, enabling optimized retention and analysis strategies. The first index removes outdated embeddings in order to reduce the computational cost of the growing multidimensional space. The second index complements the first by retaining embeddings indefinitely, allowing the system to analyze long-term patterns without impacting the performance of real-time operations.

The first index is designed to store a smaller number of embeddings, such as those generated from recent verification requests, which enables it to be updated in real time with minimal computational overhead. This limited size allows the system to efficiently handle updates and comparisons, ensuring rapid response times for real-time fraud detection and verification.

In contrast, the second index is a comprehensive repository that generally includes a significantly larger number of embeddings, representing historical data over an extended period. Due to its size, updates to the second index are performed in larger batches, requiring more time to process and integrate new embeddings. This batch updating approach balances the need for comprehensive long-term analysis with the computational demands of maintaining a larger dataset, ensuring scalability and efficiency across both short-term and long-term use cases.

The indexing system dynamically adjusts data processing strategies to address emerging fraud tactics, such as coordinated attacks or synthetic identity fraud. The first index ensures that recent activity, such as repeated verification attempts or account creation attempts, is prioritized for immediate scrutiny. The second index enables the system to detect recurring or dormant fraud patterns, such as embeddings reused across multiple accounts over time. By analyzing data in both indexes, the system can continuously refine its fraud detection algorithms, ensuring it remains effective against evolving threats. This adaptability allows the system to respond to current fraud trends while maintaining the ability to identify patterns that span extended periods.

The indexing system is inherently scalable, as its design accommodates growing datasets without compromising performance. The size and update frequency of the first and second indexes can be adjusted based on system needs, allowing the system to scale with user activity and data volume.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in an identity verification process. Computing resources used by one or more machines, databases, or networks may thus be more efficiently utilized or even reduced.

Identity Verification Using a Dual Embedding Index Process

FIG. 1 illustrates an example method 100 for identify verification using a dual embedding index process, according to some examples. Although the example method 100 depicts a particular sequence of operations, the sequence may be altered without departing from the scope of the present disclosure. For example, some of the operations depicted may be performed in parallel or in a different sequence that does not materially affect the function of the method 100. In other examples, different components of an example device or system that implements the method 100 may perform functions at substantially the same time or in a specific sequence.

FIG. 1 and features described herein are described as being performed by certain systems or applying certain processes, such as a particular machine learning model, but the processes described herein can be performed by one or more other or the same machine learning models, computer vision models, or a combination thereof.

At block 102, the indexing system receives an image of a user for an identity verification process of the user. The system relies on this input image to generate the vector embedding, which forms the basis for the downstream verification, comparison, and fraud detection pipeline.

The image may be submitted by the user (e.g., a selfie or a scanned document) via an online application, mobile app, or another interface. The image could be static (e.g., a photograph, a frame from a video) or dynamic (e.g., a video, a GIF file, group of video frames).

Before being processed by the machine learning model, the index system may perform preprocessing on the image, such as to normalize the input (e.g., resizing, color adjustment, or cropping to focus on the face) or enhance quality or remove noise for better feature extraction.

In identity verification systems, various types of inputs can be received from the user to verify their identity. Each type of input serves a specific purpose, provides additional layers of security, and enables more comprehensive verification. In some cases, the indexing system can generate embeddings of such types of inputs and/or save the various different types of inputs in a separate database without generating embeddings (as will be further discussed herein). For example, the system can generate embeddings for fingerprint data, compare the embeddings with its index of fingerprint, and once fraud is identified, mark users with the same address saved in the other database as anomalous.

In some cases, the indexing system can receive biometric data, such as data that is derived from physical or behavioral characteristics unique to an individual. A photograph or video of the user's face can be used to create a facial vector embedding.

In some cases, the indexing system receives fingerprint data of the user. The indexing system can receive a scan or photograph of the user's fingerprint, and/or use a finger print detecting device or a device that can use software to identify a fingerprint of a user. The fingerprint data can include unique ridge patterns or minutiae points (bifurcations, ridge endings) of a user's fingerprint.

In some cases, the indexing system can receive a scan of the user's eye, focusing on the unique patterns of the iris or blood vessels in the retina. The indexing system can retrieve a scan of the user's eye that includes detailed patterns unique to the individual.

In some cases, the indexing system receives voice data of a user. The indexing system can receive a recording or a live stream of the user speaking a phrase or sentence. The voice data can include features of the user's voice such as vocal tone and pitch, speech patterns and phonetic nuances.

In some cases, the indexing system receives behavioral biometrics of the user, such as inputs based on how the user performs certain tasks (e.g., typing speed, mouse movements). Such data can include unique online behavioral traits of the user, and the indexing system can continuously monitor such data without active user involvement.

In some cases, the indexing system receives document-based inputs, such as official documents issued by a government or trusted authority providing another layer of identity verification. In some cases, the indexing system receives identity documents, such as passports, driver's licenses, national ID cards or residence permits. Such documents can include unique document numbers, embedded photographs and personal details, security features like holograms and watermarks, and/or the like. Such documents can include personal information such as a name, date of birth, address, or document information such as expiry dates or issuing authority that can be extracted from the document.

In some cases, the indexing system receives utility bills or proof of address, such as scanned copies or photographs of recent utility bills or bank statements. In some cases, the indexing system can receive digital certificates, such as encrypted digital files certifying a user's identity, such as those issued by a trusted Certificate Authority (CA), which can include encryption keys, or issuer and expiration details.

In some cases, the indexing system receives text-based input that allows for the verification of knowledge-based information. In some cases, the input can include personal information, such as a name, date of birth, social security number, recent transactions, and address. In some cases, the text input can be responsive to security questions, such as questions about past events or details unique to the user. In some cases, the text input can include passcodes or PINs.

In some cases, the indexing system receives device and contextual inputs, such as geolocation data of GPS data from the user's device that can include latitude and longitude, or proximity to previously recorded locations.

In some cases, the indexing system can receive device metadata which includes details about the device used for verification (e.g., browser type, operating system), or network information such as IP addresses, MAC addresses, or the like.

At block 104, the indexing system generates a vector embedding for a face within the image using a machine learning model, the vector embedding representing the image as at least a point in a multidimensional space. The indexing system transforms the image into a compact, numerical representation that encapsulates the critical and distinguishing features of the face.

The system receives the image, which may be in various formats (e.g., JPEG, PNG) and resolutions. If the image contains more than one face or irrelevant background, a face detection algorithm isolates the region of interest (ROI) corresponding to the face.

In some cases, the detected face region undergoes preprocessing, such as resizing whereby the indexing system normalizes the dimensions of the face region to match the input requirements of the machine learning model (e.g., 128×128 or 224×224 pixels). In some cases, the indexing system performs color normalization by adjusting brightness, contrast, or color channels for consistency across different input conditions. In some cases, the indexing system performs cropping by ensuring that the face is centered within the image and irrelevant portions are removed.

The face and/or the image is inputted into a trained machine learning model. This model can include an encoder architecture trained for feature extraction. Layers of the encoder analyze the face by identifying and quantifying features, such as facial structure including positions and proportions of facial landmarks (e.g., eyes, nose, mouth), texture such as skin texture and shading patterns, global features such as shape and relative dimensions of the face, and/or the like. These features are mapped into a latent space, reducing the high-dimensional image data into a lower-dimensional but rich representation.

The machine learning model can output a vector embedding, such as a fixed-length vector (e.g., 128, 256, or 512 dimensions), where each component of the vector corresponds to a specific facial feature or characteristic. The vector captures the essential traits of the face while minimizing irrelevant details such as lighting, background, or expression. For example, a 128-dimensional embedding might look like: [0.23, −0.45, 0.78, . . . , −0.12].

The embedding is interpreted as a point in a multidimensional space, where each dimension corresponds to one feature in the vector. Similar embeddings (representing similar faces) are positioned closer to one another in this space, while dissimilar embeddings are farther apart. This spatial positioning is important for the system's subsequent comparisons and evaluations.

The machine learning model used for embedding generation is trained using large datasets of facial images to ensure robustness across variations in lighting conditions, facial angles or orientations, expressions and accessories (e.g., glasses, hats), and/or the like. The indexing system employs training using loss functions such as triplet loss or contrastive loss, which encourage embeddings of the same individual to cluster closely while embeddings of different individuals remain distinguishable.

The indexing system may apply quantization or compression to the embeddings to reduce storage size without sacrificing accuracy. The indexing system may optimize the embeddings for speed to enable real-time or near-real-time generation, ensuring a seamless user experience during identity verification.

At block 106, the indexing system compares the vector embedding with a first index of embeddings. The indexing system compares the vector embedding with embedding repositories to determine a likelihood of fraud (or at least is one of the steps included in determining a likelihood of fraud as will be further described herein).

The indexing system conducts a comparison between the vector embedding generated from the user's input image and the embeddings stored in the first index. The indexing system can compare the embeddings to determine a degree of similarity between the new embedding and the embeddings already present in the first index.

The first index is uniquely designed to maintain a subset of embeddings that reflect more recent activity in the system. This time-sensitive nature ensures that comparisons focus on embeddings likely to exhibit fraudulent or anomalous patterns relevant to recent operations.

The first index operates on a first time interval, which can be on a real-time or near-real-time update cycle. New embeddings are immediately and/or frequently incorporated into the index as they are generated, such as every second, minute, hour, day, or week. This ensures that the index contains the most up-to-date data.

The contents of the first index typically span a specific temporal window, such as the last three weeks or three months, and/or may also be constrained by a maximum number of embeddings.

The indexing system computes a distance or similarity between the new embedding and each embedding in the first index. In some cases, the indexing system applies a cosine similarity that measures the cosine of the angle between two vectors in the multidimensional space. Closer angles indicate higher similarity. In some cases, the indexing system applies a Euclidean distance that measures the straight-line distance between two points in the multidimensional space. Smaller distances indicate higher similarity.

In some cases, the indexing system identifies a predefined number of nearest neighbors (e.g., the top 100 most similar embeddings) from the index. These embeddings are those with the smallest distances or highest similarity scores relative to the new embedding. This narrows down the focus to a manageable subset of candidates that could represent potential fraud.

Since the first index reflects recent activity, matches in this index are particularly significant for detecting fraud patterns that occur in bursts. For instance, a single face might appear in multiple recent applications, potentially using different PII to create fake accounts, or fraudsters may repeatedly attempt verification within a short timeframe using slightly modified inputs.

If the new embedding is found to be highly similar to one or more embeddings in the first or second index, in some embodiments, the system may flag the comparison as suspicious. In some embodiments the system may flag comparison as suspicious upon finding the new embedding to be highly similar to a predefined subset of embeddings in the first or second index. The indexing system may determine a fraudulent identity verification attempt, or may perform further steps to confirm fraud (as further described herein).

The comparison step in block 106 can provide a preliminary assessment of whether the new embedding exhibits patterns consistent with recent fraudulent behavior. If a match or near-match is found, the indexing system can flag identity theft (e.g., the same face submitted with different PII), may signal fraudulent account creation using similar or slightly altered inputs, or may determine attempts to exploit the system using repeated submissions with minor variations.

Figure 2:
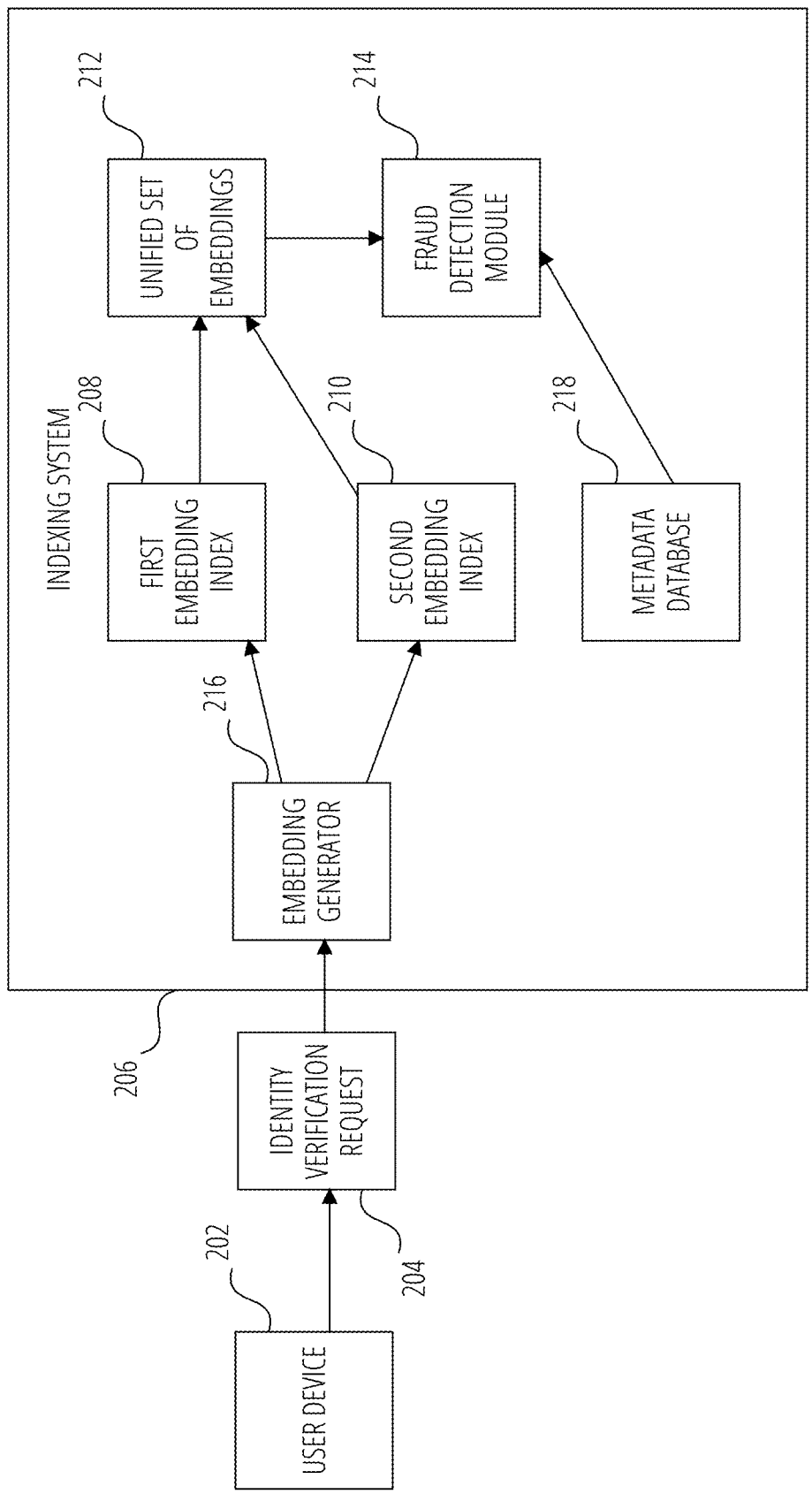
FIG. 2 illustrates an architectural diagram for fraud detection using a dual indexing system, according to some examples.

FIG. 2 illustrates an architectural diagram for fraud detection using a dual indexing system, according to some examples. A user device 202 can submit an identity verification request 204 to the indexing system 206. This request can include user-provided data, such as an image or other biometric input, intended for identity verification. The system uses this input as the basis for further processing, setting the stage for fraud detection and authentication workflows.

Once the indexing system (206) receives the identity verification request, the system applies an embedding generator (216), such as an encoder model, to process the user-provided image. The embedding generator extracts key features from the image, such as facial structure or other unique characteristics, and encodes these features into a vector embedding. This embedding represents the image as a mathematical abstraction in a multidimensional space, allowing for efficient comparison against previously stored embeddings while preserving the uniqueness of the user's identity.

After generating the vector embedding, the system performs a comparison with a first embedding index (208). This index, often referred to as the first index, contains embeddings from recent identity verification activities, updated in real time or near real time. The comparison determines how closely the newly generated embedding matches any recent embeddings in the first index, identifying potential patterns of fraudulent activity, such as repeated or conflicting submissions using the same or similar biometric data. This step enables rapid detection of short-term fraud patterns and anomalies that are critical for real-time fraud prevention.

At block 108, the indexing system compares the vector embedding with a second index of embeddings. The indexing system performs a comparison between the newly generated vector embedding and a second index of embeddings. This step complements the comparison conducted with the first index at block 106 by focusing on embeddings that represent historical data rather than recent activity.

The second index serves as a comprehensive repository of more embeddings than the first index (such as all of the historical embeddings, a great number of embeddings, or spanning over a larger time frame than the time frame for the first index). The second index is designed to identify patterns or matches that may have occurred over a longer time horizon, enabling the detection of fraud that spans extended periods or involves older records.

The second index stores more embeddings created by the system, providing a complete historical record for comparison. The second index is updated in batches at predefined intervals, such as weekly or monthly, rather than continuously or in real-time for the first index, or at larger time intervals than the first index.

Unlike the first index, which is optimized for recency and computational speed, the second index prioritizes coverage and long-term analysis, making it suitable for detecting fraudulent activities that are distributed across time or involve previously inactive records.

The second index is significantly larger than the first index, often encompassing hundreds of millions of embeddings. To ensure computational efficiency, the second index may be stored on dedicated servers with high-capacity memory and optimized indexing structures, such as hierarchical navigable small-world graphs (HNSW) or inverted file structures, and may not be updated more frequently as the second index.

The indexing system applies one or more similarity or distance metrics to compare the vector embedding with embeddings stored in the second index, such as cosine similarity or Euclidian distances. Based on the similarity calculations, the system identifies a predefined number of nearest neighbors (e.g., the top 100 closest embeddings) from the second index. These matches represent historical embeddings that are most similar to the new embedding and are flagged for further analysis.

Given the size of the second index, the indexing system can employ techniques to optimize the comparison process, such as index partitioning by dividing the second index into smaller subsets based on criteria like timeframe, geography, client, or embedding properties, applying other types of nearest neighbor algorithms such as approximate nearest neighbor (ANN) algorithm to quickly find approximate matches rather than performing exhaustive comparisons, or perform hierarchical comparisons by first conducting a coarse-grained search to narrow down candidates, followed by fine-grained similarity calculations.

To further optimize the comparison and reduce the amount of analyzed data the records in the first and the second index or the embedding search results may be filtered or grouped on the basis of data, associated with the user verification request such as the request criteria like geography, client name or user PII, such as the user's name, document data, contact details or address.

In some cases, the indexing system improves the comparison process between the new embedding and the two indexes via clustering. The embeddings in each index are organized into clusters, with each cluster containing points that are relatively close to each other in the multidimensional space. For example, the system may split the index data into 1,000 clusters based on spatial proximity. During the search or analysis, the system identifies the nearest cluster(s) to the new embedding and limits the comparison to embeddings within those clusters. For instance, instead of searching across all 1,000 clusters, the system may narrow the search to the top 10 clusters that are closest to the candidate embedding.

This clustering-based approach drastically reduces the search space, making comparisons more efficient while still maintaining accuracy. It ensures that the system focuses computational resources on embeddings that are more likely to be relevant, improving scalability and response times. The clustering process can be applied differently to the two indexes; the first index may use fewer clusters due to its smaller size, enabling even faster comparisons, while the second index may employ more clusters to accommodate its larger dataset and support long-term fraud detection.

Another method for optimizing comparisons is through quantization, which involves the indexing system reducing the dimensionality of embeddings by retaining only the most important dimensions. The indexing system learns which dimensions contribute most to identifying matches or detecting anomalies and discards the less significant dimensions, effectively compressing the data while preserving key patterns.

Quantization allows the system to compare embeddings faster by working with a simplified version of the data, which is particularly useful for the second index with its larger size and historical scope. The first index, on the other hand, may not require as aggressive dimensionality reduction due to its smaller and more recent dataset. By employing quantization, the system ensures that comparisons remain computationally efficient, enabling it to handle growing datasets without compromising performance. This approach is particularly valuable when balancing real-time responsiveness with the need for comprehensive analysis.

The second index enables the detection of fraud patterns that may not be evident in the first index due to its recency focus. For example, a fraudster might reuse the same face or document across multiple accounts over several months or years, or the second index may identify connections between embeddings that can reveal hidden relationships, such as repeated use of the same face with different PII, such as the user's name, document data, contact details or address.

Because the second index can include embeddings from the system's inception or for a longer period of time, the second index provides comprehensive coverage that ensures no older embeddings are overlooked. This is particularly important for cases where fraud attempts are sporadic or occur after long intervals of inactivity.

While the first index excels in capturing recent and high-frequency fraud, the second index fills the gap by addressing historical fraud scenarios. The combination of both indexes ensures that the system can detect fraud across both short-term and long-term timelines.

At block 110, the indexing system determines a characteristic of potential fraud based on the comparison of the vector embeddings with the first and second index. At block 110, the indexing system determines a characteristic of potential fraud by analyzing the results of the comparisons conducted between the newly generated vector embedding and the embeddings stored in the first index and the second index.

This step synthesizes the outcomes of the two prior comparisons to identify patterns, inconsistencies, or anomalies indicative of fraudulent activity. The determination of fraud characteristics can involve evaluating similarity metrics, temporal factors, and contextual relationships among embeddings and their associated metadata.

At this stage, the system has similarity results that include a set of embeddings from the first index, representing recent matches or near-matches to the newly generated embedding, and a set of embeddings from the second index, representing historical matches or near-matches.

The system determines the characteristic of potential fraud by further analyzing one or more characteristics. For example, the indexing system can analyze associated metadata such as names, dates of birth, addresses, or document details (PII), associated with the embeddings retrieved from the indexes, or similarity metrics such as calculations that quantify how closely the new embedding matches the retrieved embeddings.

In some cases, the system evaluates whether the similarity scores between the new embedding and retrieved embeddings exceed predefined thresholds. Matches with high similarity scores indicate potential fraudulent activity. Embeddings retrieved from both indexes can be ranked by similarity scores, prioritizing those most closely matching the new embedding.

The indexing system can combine results from the first and second indexes into a unified dataset, removing duplicates and weighting matches based on recency and similarity. Matches that appear in both indexes can be given higher weight, as they indicate consistent fraudulent activity across time.

In some cases, the indexing system cross-references PII or other associated metadata linked to the embeddings to identify inconsistencies or anomalies, such as the same face associated with different names, dates of birth, or addresses or multiple embeddings tied to the same face but linked to different geographic regions or IP addresses. The indexing system can identify repeated matches and flag or blacklist such embeddings.

In some cases, the indexing system considers contextual factors, such as the geographic region, type of transaction, or system-defined risk level, when assessing the likelihood of fraud. In some cases, the indexing system incorporates contextual factors to refine its assessment of the likelihood of fraud, tailoring its analysis to the specific circumstances of the user or transaction.

For example, the geographic region associated with the vector embedding or its linked metadata may influence the system's evaluation. Certain regions with historically higher instances of fraud may trigger stricter similarity thresholds or additional checks when embeddings from those areas exhibit close matches to others in the index.

Discrepancies between the embedding's associated location and the user's stated or expected location can indicate suspicious activity, such as account access from an unusual or unauthorized location. This contextual filtering allows the system to dynamically adapt its fraud detection process based on environmental or demographic factors, increasing its precision and reducing false positives.

The type of transaction is another critical contextual factor the system may consider. High-value or sensitive transactions, such as financial transfers or access to privileged accounts, often warrant more stringent fraud detection protocols compared to lower-risk activities like login attempts.

Additionally, a system-defined risk level, which may incorporate user behavior patterns, account history, or external threat intelligence, provides an overarching framework to adjust fraud detection parameters. For instance, an account flagged as high-risk due to past anomalies or suspicious behavior may prompt the system to prioritize its analysis, apply tighter thresholds for similarity matching, or escalate the review process for manual oversight. By integrating these contextual factors, the system not only improves its adaptability and responsiveness but also ensures that its fraud detection efforts are aligned with the varying levels of risk and operational priorities across different scenarios.

In some cases, the indexing system assesses patterns of repeated submission over specific intervals (e.g., bursts of activity followed by inactivity) that may signal coordinated fraudulent efforts. Patterns of repeated submission over specific intervals, such as bursts of activity followed by periods of inactivity, can be a strong indicator of coordinated fraudulent efforts. Fraudsters often operate in bursts to maximize their success within a short timeframe, submitting multiple verification attempts or creating multiple accounts in rapid succession. These bursts may be followed by a deliberate pause in activity, intended to evade detection by traditional monitoring systems that might flag consistent or continuous suspicious behavior.

By analyzing these patterns, the system can detect anomalies that are less apparent in individual submissions but become evident when viewed in aggregate over time. For example, if the same face embedding or closely matching embeddings are submitted repeatedly within a short period, linked to different PII or geographic locations, it could signify an attempt to bypass identity verification using altered or cloned data.

These repeated submission intervals, combined with metadata inconsistencies-such as changing IP addresses, device fingerprints, or geographic regions-enhance the system's ability to flag potential fraud. By correlating these time-based patterns with other contextual factors, the system can distinguish coordinated fraudulent efforts from legitimate high-frequency activity, such as a user attempting to reverify due to technical issues.

Returning to FIG. 2, the vector embedding generated by the embedding generator is also compared with the second embedding index (210). Unlike the first embedding index, which contains recent embeddings, the second index stores a comprehensive collection of historical embeddings. This comparison allows the system to identify matches or patterns that span longer time periods, enabling the detection of fraudulent activity that may not be evident in the first index alone.

The results of the comparisons with the first and second embedding indexes produce a first set of embeddings and a second set of embeddings, respectively. These two sets are subsequently combined to create a unified set of embeddings (212). During this combination, duplicates are removed, and additional weighting may be applied based on factors such as recency, similarity scores, or cross-index matches. This unified set provides a consolidated view of potentially relevant embeddings for further analysis.

The system then processes the unified set of embeddings through its fraud detection modules (214). These modules analyze the embeddings to identify a likelihood of fraud by evaluating similarity scores, contextual metadata, and patterns of activity. By integrating data from both embedding indexes, the fraud detection modules can deliver a robust assessment of fraudulent behavior, accounting for both recent and historical activity, and enabling accurate, context-aware fraud prevention.

In some cases, instead of directly combining the sets of embeddings from the first index and the second index into a unified dataset, the indexing system applies a clustering algorithm to refine the dataset. The indexing system groups similar embeddings into clusters based on their spatial proximity in the multidimensional space, aiming to identify meaningful patterns while reducing false positives.

The indexing system starts with the embeddings retrieved from both the first and second indexes after the similarity comparisons. A clustering algorithm is applied to the embeddings. The algorithm groups embeddings into clusters where embeddings within a cluster have higher similarity to each other, and embeddings in different clusters have lower similarity or no significant relationship.

Noise or outliers (embeddings that do not belong to any cluster) are removed to focus on meaningful matches. Clusters with embeddings that strongly correlate with fraudulent behavior (e.g., embeddings flagged from prior fraudulent activities) are prioritized for further analysis.

By grouping embeddings, the indexing system helps differentiate legitimate variations (e.g., the same user submitting multiple verification requests) from actual fraud patterns (e.g., different users attempting to mimic a single identity). Moreover, clustering simplifies the analysis by reducing the number of comparisons to a smaller number of meaningful groups rather than individual embeddings.

As an example, a fraudster uses the same or similar face image across multiple accounts but with slight variations (e.g., different lighting or angles). The images may be sourced from stolen documents, public social media accounts, can be synthetically produced using generative AI models or conventional fording methods. These variations might result in high similarity scores across multiple embeddings, potentially overwhelming the system with false positives. Clustering consolidates these variations into a single fraud-related cluster, streamlining the system's analysis.

In another example, instead of combining embeddings from both indexes into a unified dataset immediately, the system adopts a sequential approach. The indexing system first compares the newly generated vector embedding with one index (e.g., the first index) and uses the results to decide whether a deeper check against another index (e.g., the second index) and/or vice versa.

For example, the indexing system first compares the vector embedding with embeddings in the first index, which contains recent data and is updated in real time. If no significant matches are found in the first index, the indexing system may classify the request as low risk and skip further analysis, saving computational resources. If significant matches or suspicious patterns are detected, the indexing system proceeds to compare the embedding with the second index for deeper analysis.

In another example, the indexing system skips the second index if significant matches or suspicious patterns are identified in the first index, while comparing the embedding with the second index if no matches are found with the first index.

At block 112, the indexing system outputs identity verification results based on the likelihood of fraud. The indexing system produces identity verification results based on the likelihood of fraud by translating the technical outputs of the fraud detection process-such as similarity scores, metadata inconsistencies, and contextual factors-into actionable outcomes. These results indicate whether the user's identity verification request is legitimate, potentially fraudulent, or requires further review, ensuring that appropriate actions are taken based on the system's findings.

The likelihood of fraud is determined as part of the indexing system's analysis process after identifying points in the multidimensional space (embeddings) that exhibit significant similarity to the newly generated vector embedding. At this stage, the system evaluates whether the identified matches are indicative of fraudulent activity or legitimate variations, using one or more processes such as cross-checking metadata, grouping and filtering user data, and/or eliminating false positives.

After identifying similar embeddings, the indexing system references Personally Identifiable Information (PII) linked to these embeddings to validate the identity verification request further. In some cases, PII data, such as names, dates of birth, addresses, or IP addresses, is stored in a separate database, such as a conventional non-vector database. For example, such PII data can be stored in files and/or in tabular form.

The system cross-references the PII associated with the matched embeddings to detect inconsistencies or suspicious patterns. For example, the same face embedding matched across multiple records with differing names or addresses suggests fraudulent use of the same biometric data. Matches where the PII aligns across records indicate legitimate activity, reducing the likelihood of fraud.

In some cases, the system groups and filters user data to highlight unusual activity patterns that might signal fraud. Embeddings retrieved during the comparison phase are analyzed alongside their associated metadata to identify clusters or anomalies. For example, a single user may submit multiple verification requests over time (e.g., for account updates or multiple services). These requests would align in both embeddings and PII, forming a consistent group.

If a face embedding repeatedly appears across requests from different geographic regions, with inconsistent metadata, or in rapid succession, the indexing system could flag these attempts as coordinated fraud attempts. In some cases, the indexing system performs filtering to separate legitimate clusters of user activity from suspicious patterns, ensuring that only genuinely anomalous behaviors are flagged for further scrutiny. This grouping and filtering reduce noise and focus the analysis on patterns that deviate from expected behavior, increasing the likelihood of detecting sophisticated fraud attempts.

In some cases, the indexing system filters out false positives in the fraud detection process to ensure legitimate users are not mistakenly flagged as fraudulent. In the context of identity verification (but as discussed, features described herein can be applied in other use cases), self-matches-cases where the same person submits multiple verification requests—are common and expected. For example, a user may need to verify their identity for different services, update account information, or reinitiate verification due to a system timeout or error. These requests would naturally generate similar or identical embeddings and associated metadata, such as name, date of birth, and address. The index system recognizes these as legitimate and excludes them from fraud detection workflows to avoid unnecessary delays or user dissatisfaction.

To achieve this, the system cross-references key personal data (e.g., PII such as name, date of birth, and address) associated with the embeddings identified as matches. When all or a significant subset of this data aligns across multiple requests, it strongly indicates that the requests originate from the same individual rather than an impersonator. Additionally, temporal factors can further support this analysis; for instance, repeated submissions within a short timeframe from the same geographic region and device can be determined in some circumstances to be due to legitimate reasons, such as retries or parallel processes, rather than malicious intent. By integrating these checks, the system can effectively distinguish between self-matches and actual fraudulent behavior.

The indexing system can apply predefined rules or thresholds to remove these self-matches from the dataset of potential fraud cases. For example, if an embedding closely matches multiple others and the associated PII is identical or highly similar, the system categorizes it as a self-match and excludes it from further fraud analysis. This reduces the noise in the dataset, enabling the system to focus computational resources on genuinely suspicious activity. Without this filtering step, the system could be overwhelmed with false positives, leading to inefficiencies, higher operational costs, and a degraded user experience.

Moreover, filtering out false positives enhances the system's overall reliability and credibility. Users are less likely to encounter unnecessary disruptions in legitimate transactions, and clients relying on the system can trust its outputs with greater confidence. Thus, the indexing system improves the efficiency of downstream processes, such as manual reviews or additional verification checks, by ensuring that only high-risk cases are escalated.

While the disclosure describes certain fraud detection algorithms or processes, it is acknowledged that other algorithms or processes can apply to the features described herein. Fraud detection in the described system relies on one or more algorithms or processes designed to analyze and interpret data from the first and second indexes. These algorithms evaluate the likelihood of fraudulent activity by examining patterns, inconsistencies, and relationships among embeddings, metadata, and contextual factors. The system described herein provides a framework for applying specific fraud detection processes, but it is inherently flexible, allowing the integration of other algorithms or techniques to address various use cases or evolving fraud patterns.

For example, the features described herein can apply fraud detection algorithms based on similarity-based detection where core algorithms use similarity metrics, such as cosine similarity or Euclidean distance, to compare the vector embedding with embeddings stored in the first and second indexes. In some cases, cluster analysis can be applied to group embeddings to identify clusters of suspicious activity. For example, fraud might be inferred if a cluster contains embeddings tied to differing PII or geographic regions but shares a high degree of facial similarity. Temporal analysis can be applied to assess patterns of activity over time, such as bursts of verification attempts from the same or similar embeddings, to detect coordinated fraudulent efforts.

Machine learning models can be trained to detect anomalies in embedding similarities, metadata discrepancies, or temporal patterns. For example, a neural network could be trained to identify fraud signals in complex multidimensional relationships. Rules-based systems can be applied with customizable rule sets for specific industries or geographies, such as stricter thresholds for high-risk regions or transactions.

In some cases, the system's indexes can be designed to be adaptable, allowing the update frequency and/or storage capacity to vary based on specific contextual factors. This flexibility enhances the system's ability to respond to varying fraud detection needs while optimizing computational resources.

In some cases, the index update frequency and/or storage capacity can be dynamically adjusted based on geographic factors. For example, different regions may have varying levels of fraud risk, necessitating adjustments in how the first index is updated. The indexing system may set faster update cycles (e.g., every 5 seconds) for regions with higher fraud rates or more active users to ensure the index remains current and effective at detecting fraud in real-time. Conversely, regions with lower fraud activity may only need updates at longer intervals (e.g., every 3 weeks), reducing computational overhead without compromising accuracy. For example, a financial service in a high-risk region might update the first index almost instantaneously to catch coordinated fraud attempts, while a service in a low-risk region might update weekly.

In some cases, the index update frequency and/or storage capacity can be dynamically adjusted based on gender and/or age factors. Certain demographic groups may exhibit different patterns of activity or fraud risk, prompting tailored index update strategies. If historical data shows that specific genders have distinct fraud risk profiles, the system can prioritize updates or allocate index resources accordingly. Older individuals may have less frequent account activity, meaning their embeddings might require less frequent updates. Younger users, being more active, may benefit from more regular updates. For older users who rarely log in or verify their identity, embeddings could remain static for extended periods unless triggered by specific activity, while younger users might have embeddings updated dynamically to reflect frequent transactions.

In some examples, the indexing system stores metadata in a separate database, such as a PII database, that serves as a complementary component in the fraud detection system, storing and managing PII such as names, dates of birth (DOB), addresses, IP addresses, and geographic locations. This PII could be maintained in a conventional non-vector database, distinct from a vector database used to index embeddings generated by the machine learning model. This separation ensures that biometric data (embeddings) and user metadata (PII) are handled independently for privacy, scalability, and computational efficiency. A vector database may additionally store database record reference tokens that correspond to PII records in the non-vector database associated with the vector embeddings stored in the vector database.

As shown in FIG. 2, the indexing system includes a metadata database 218 that can be applied to the fraud detection module. Storing PII separately from the embeddings ensures that sensitive user information, such as names, dates of birth, and addresses, does not need to be converted into embeddings and incorporated into the multidimensional space. If PI were embedded, the dimensionality of the space would expand significantly, making it computationally inefficient and increasing the complexity of similarity comparisons.

By maintaining PII in a conventional database, the system preserves the compactness and efficiency of the embedding space, which is optimized for biometric data. This separation allows for focused and scalable processing of embeddings while enabling the system to cross-reference PII only when needed for validation or fraud detection, ensuring both performance and accuracy.

PII data is stored in a structured format, such as tabular files or relational database tables. This allows efficient querying, retrieval, and management of metadata associated with user accounts and verification requests. The indexing system links the metadata to embeddings without embedding this information directly into the machine learning pipeline, maintaining modularity.

Each embedding generated by the system is associated with a corresponding PII record in the database. This link allows the system to cross-reference metadata during fraud detection, such as to correlate biometric data with contextual information, enhancing the analysis of similarity results or to enable validation of embeddings by checking if the linked PII aligns with expected patterns or other system records. For example, if two embeddings are highly similar, but their linked PII records contain discrepancies, such as different names, dates of birth, contact details or addresses, this discrepancy signals potential fraudulent use of the same biometric data.

When the system identifies fraud based on embedding similarity or other metrics, the system flags the associated PII records in the database to maintain a record of suspicious or fraudulent activities for future reference and ongoing monitoring and/or to block further use of the flagged PII in identity verification processes, enhancing security. For example, if a face embedding is linked to multiple fraudulent account creation attempts, the system flags the PII (e.g., name, DOB, IP address) for those requests, preventing further use of the same information.

In some cases, PII is used as an additional validation layer to confirm or refute potential matches identified during embedding comparisons. For example, if two embeddings are highly similar but their PII records match (e.g., same name, DOB, and address), the system can determine that it is a legitimate self-match rather than fraud.

In some cases, the system groups and filters embeddings based on associated PII data, enabling advanced fraud detection features. For example, embeddings linked to different PII but submitted from the same IP address or geographic location may indicate a coordinated fraud attempt. By grouping these embeddings, the system can uncover hidden relationships.

The integration of the embedding database (vector-based) with the PII database (non-vector-based) allows for a holistic analysis that combines biometric and contextual information. For example, the indexing system may identify embeddings with high similarity scores in a query that are linked to PII records containing conflicting geographic locations or repeated use of flagged IP addresses. This combined analysis uncovers fraud indicators that would be missed by analyzing embeddings or PII in isolation.

In some cases, the system assigns a characteristic or label to the new embedding based on the analysis, such as high likelihood of fraud such as based on multiple high-similarity matches in both indexes, particularly if associated metadata conflicts or previously flagged embeddings are involved, low likelihood of fraud such as when no significant matches in either index are found, or matches with consistent and verified metadata, or unclear or ambiguous with matches of moderate similarity scores or limited supporting metadata, requiring additional verification steps.

In some cases, the indexing system generates a report or summary of the analysis for the verification request. This may include similarity scores and matched embeddings, metadata discrepancies, such as mismatched names, addresses, or geographic locations, contextual factors that influenced the decision, such as region-specific fraud trends or transaction type, and/or the like.

After the system determines whether fraud is present or absent, several practical applications or actions can be taken based on the outcome. These actions can help to enhance system robustness, improve fraud detection capabilities, and mitigate risks associated with fraudulent or legitimate activity.

If fraud is detected, the system may prioritize mitigation, prevention of further harm, and learning from the identified fraudulent activity. The embedding associated with the detected fraud can have its weight increased in the multidimensional space. This ensures that similar embeddings in future requests are flagged more readily during comparisons.

In some cases, the embeddings and associated metadata from confirmed fraud cases can be used to retrain the ML model, refining its ability to detect fraudulent patterns in the future. This retraining process can include incorporating the fraudulent embeddings into the model's dataset, allowing it to learn new fraud signals, such as subtle similarities in biometric data, repeated patterns of metadata inconsistencies, or geographic anomalies. By exposing the model to these real-world fraud examples, it becomes more adept at distinguishing fraudulent embeddings from legitimate ones, reducing false negatives and improving its ability to identify complex or evolving fraud tactics. This continuous learning ensures the model remains robust, adaptive, and effective against emerging fraud trends.

If fraud involves identity theft, the system can send real-time alerts to the affected individual. For example, the system can retrieve contact details from a third-party database or previously submitted information. Notifications might include steps for the individual to verify their identity or secure their accounts.

In some cases, the system can immediately lock the compromised account, freeze associated funds, or disable certain features to prevent further fraudulent transactions or activity. If fraud is detected mid-transaction, the system can terminate the transaction to mitigate financial or operational loss.

In some cases, the system can generate a separate, dedicated fraud-specific multidimensional space (e.g., a third index) that can store embeddings exclusively associated with known fraudsters or fraudulent activity. This space serves as a centralized repository for analyzing and comparing new embeddings against a curated set of high-risk data. By isolating fraud-related embeddings, the system can efficiently identify connections between new attempts and historical fraud patterns, such as repeated use of similar biometric data or metadata inconsistencies. Additionally, this dedicated space can be used to refine fraud detection algorithms, providing a targeted dataset for retraining models and testing new detection strategies.

The third, fraud-specific index can be weighted more heavily in the fraud detection algorithm because the embeddings it contains are directly linked to points with a higher likelihood of fraudulent activity. During the comparison process, embeddings retrieved from this index can be assigned greater importance or influence in the overall similarity calculations, signaling higher risk when matches occur. This weighting ensures that even moderate matches with embeddings in the fraud-specific index are flagged for additional scrutiny, as these embeddings represent known fraud patterns. By prioritizing data from this targeted index, the system enhances its ability to detect and respond quickly to high-risk activities, effectively reducing false negatives and improving the accuracy of fraud detection. This approach streamlines the identification of repeat offenders and similar fraud schemes, making the detection process more robust and reliable.

If no fraud is detected, the system can focus on streamlining the user experience and preparing for future legitimate activities. The system can whitelist embeddings associated with the user to ensure faster processing of future requests and/or inform the user that their verification request has been successfully processed.

If no fraud is detected, embeddings associated with the legitimate user can be transitioned from the first index to the second index (and/or vice versa), maintaining system efficiency. In some cases, the indexing system can update associated metadata or risk scores in the system to reflect legitimate behavior for the user, embedding, or the set of PII.

When the system determines that no fraud is present, the indexing system can grant the user access to the requested system or features. For example, in a financial system, this could mean allowing the user to log in to their account, initiate a transaction, or update their profile information. This step ensures that legitimate users can continue their activities seamlessly without unnecessary interruptions. The system may also enable previously restricted features, such as increased transaction limits or access to sensitive account settings, as a sign of trust in the user's identity.

If no fraud is detected, the system proceeds to approve any pending transactions or requests linked to the verification process. For instance, a user may have initiated a fund transfer, created a new account, or submitted a request for account recovery. Once the verification is complete, the system confirms the legitimacy of the request and finalizes the transaction or grants approval. This ensures that legitimate operations are not delayed unnecessarily, maintaining the efficiency and reliability of the system.

The approval process can include updating the transaction or request status in the backend system to reflect the verified outcome. For example, a "pending" status may be updated to "approved," triggering notifications to the user about the successful completion of their request.

When the system identifies an unclear or ambiguous fraud status, the indexing system can request additional identity verification documents, such as a second government-issued ID, a utility bill, or other proof of identity. These supplementary documents provide additional data points for confirming the user's legitimacy. The system may prompt the user via email, SMS, or an in-app notification to upload these documents securely. In some cases, knowledge-based authentication (KBA) questions, such as asking about past addresses or recent financial transactions, can be employed as an additional layer of verification.

In some cases, the system might maintain a separate multidimensional space index for embeddings generated from the supplementary information. For example, the vector embedding of the second ID or utility bill can be compared against existing embeddings for consistency. This index serves as an auxiliary dataset to refine the system's fraud assessment and clarify ambiguous cases. By analyzing this supplemental data, the system can reach a more definitive conclusion about the user's legitimacy while maintaining efficiency and accuracy.

In some cases, the system may require the user to undergo live video or selfie verification to resolve an unclear fraud status. The indexing system can prompt the user to capture a real-time video or selfie, with specific actions such as blinking, smiling, or turning their head to demonstrate liveness and prevent spoofing attacks. The live video or selfie is processed by the system to generate a new vector embedding, which is then compared against existing embeddings in both the first and second indexes.

This process adds a layer of liveness detection to ensure the user is physically present and not attempting to use static images or deepfake technology. Live video verification also allows the system to match real-time data with prior embeddings and metadata, providing stronger evidence of the user's authenticity. By integrating real-time biometrics into the fraud detection pipeline, the system can efficiently clarify ambiguous cases while deterring fraudulent actors.

For cases where fraud is unclear and additional verification is pending, the system may temporarily lock or suspend the user's account to prevent unauthorized access or malicious activity. This action ensures that no potentially fraudulent actions, such as accessing sensitive account information or performing transactions, can occur while the user's legitimacy is under review. Notifications can be sent to inform the user of the suspension and outline the required steps to restore access.

Additionally, ongoing transactions can be blocked until verification is complete. For example, a financial transfer initiated by the user may be placed on hold, and the user is notified of the delay. The system logs the transaction and links it to the pending verification process to ensure continuity once the review is resolved.

The indexing system, while primarily designed to create and compare embeddings based on a user's face, can extend its functionality to process a variety of other inputs. These inputs span different types of biometric, document-based, and contextual data, enabling a comprehensive and flexible identity verification framework. The indexing system may be purposed to optimize storage and processing of any type of vector embeddings for any type of task, where embedding storage, processing, search and retrieval is needed. The type of data that can be encoded in a vector embedding is defined by the type of data for which a machine learning model has been trained to generate an embedding. The indexing system can work with any type of embedding generating machine learning model.

In some cases, the system processes photographs or videos of the user's face to generate a facial vector embedding, which represents the user's unique facial features in a multidimensional space. In some cases, the system can receive scans or photographs of a user's fingerprint or data captured through a fingerprint-detecting device. The indexing system can process the fingerprint to extract unique patterns, such as ridges and minutiae, and generates an embedding.

In some cases, the system receives detailed scans of a user's eye, focusing on the unique patterns of the iris or blood vessels in the retina, to generate an embedding that is both unique and resistant to spoofing attempts. In some cases, the system processes recordings or live streams of a user speaking. Features such as tone, pitch, phonetic nuances, and speech patterns are analyzed to generate a voice vector embedding, which serves as a unique identifier.

In some cases, data based on a user's behavior, such as typing speed, mouse movements, or navigation habits, is continuously monitored and analyzed. This data is converted into embeddings that reflect unique behavioral traits.

In some cases, the system can process scanned copies or photographs of government-issued documents such as passports, driver's licenses, or national ID cards. The system extracts features like document numbers, embedded photos, and holograms, converting them into embeddings for comparison.

In some cases, the system uses scanned or photographed bills or bank statements to extract key details, such as addresses or account numbers, to create embeddings. In some cases, the indexing system processes digital certificates issued by trusted Certificate Authorities (CAs) by extracting information such as encryption keys, issuers, and expiration dates to generate document-based embeddings.

In some cases, the system creates embeddings of personal information, such as text inputs, (e.g., dates of birth, or social security numbers, are processed to verify the user's knowledge of specific information), or answers to knowledge-based authentication (KBA) questions about past events or personal details are compared with stored records. In some cases, the system creates embeddings for passcodes or PINs.

In some cases, the system creates embeddings for geolocation data, including latitude and longitude or proximity to previously recorded locations, that can be processed to validate a user's current location against expected patterns. In some cases, the system creates embeddings of device metadata such as details about the user's device (e.g., browser type, operating system, IP address, or MAC address) to validate the context of the identity verification request.

While the indexing system is described for identity verification, it is appreciated that the features described herein (e.g., the first and second indexes) can be applied to a wide range of other use cases. These applications can include detecting and preventing fake accounts, identifying bot activity, combating transaction fraud, and more general scenarios requiring pattern recognition or anomaly detection.

The system can detect fake accounts by analyzing embeddings derived from account creation data, such as profile pictures, submitted documents, or metadata like IP addresses and geolocation. The system compares these embeddings with those in the first and second indexes to identify patterns indicative of fake accounts, such as multiple accounts using similar data or embeddings associated with flagged accounts.

The system can analyze behavioral patterns and metadata to distinguish bots from real users. The indexing system can continuously monitor behavioral data, such as typing speed, mouse movements, or interaction frequency and convert into embeddings. Embeddings are analyzed against stored patterns of bot activity in the first and second indexes. The indexing system can identify similarity to bot-associated embeddings or anomalies in behavior compared to human users triggers detection.

The disclosure describes the use of two indexes-a first index and a second index to efficiently manage embeddings for identity verification and fraud detection. However, it is appreciated that the system is inherently flexible and can be extended to incorporate multiple indexes, each tailored to specific update frequencies and data management requirements, or a single index that maintains embeddings only to a certain time period or a number of embeddings.

In some cases, the system can be designed with indexes updated at different intervals, allowing it to balance real-time detection needs with long-term analysis. For example:
  1st Index (Monthly Updates): A comprehensive index storing the largest number of embeddings, designed for historical analysis and capturing long-term trends.
  2nd Index (Weekly Updates): A mid-sized index providing a balance between recency and coverage, suitable for identifying patterns over medium timeframes.
  3rd Index (Daily Updates): A smaller, highly responsive index optimized for real-time or near-real-time detection, capturing the most recent user activity.

Each index may store a different number of embeddings, reflecting the trade-off between recency and historical scope. The 1st index can include the largest dataset, covering all embeddings from the system's inception, ensuring no historical data is overlooked. The 2nd index can include a subset of embeddings from recent months, maintaining a balance between size and recency. The 3rd index is the smallest, focusing solely on embeddings generated within the past few days or weeks for quick and efficient comparisons.

With multiple indexes, the system can perform layered analyses. For example, embeddings can first be compared against the 3rd index for immediate matches, followed by deeper checks against the 2nd and 1st indexes if necessary.

This hierarchical approach allows for precise fraud detection without overwhelming computational resources.

By limiting real-time comparisons to the smallest index, the system reduces computational overhead while reserving larger, less frequently updated indexes for deeper historical analysis. This ensures scalability as the system expands to handle more users and embeddings.

Systems and methods described herein include training a machine learning network, such as training to determine fraud or legitimacy in identity verification processes. The machine learning network can be trained to analyze embeddings generated from biometric data, document data, behavioral data, or metadata, and to identify patterns or anomalies indicative of fraud. The machine learning algorithm can be trained using historical fraud data that includes embeddings, associated metadata, and labeled outcomes (e.g., fraudulent or legitimate), enabling the model to refine its ability to detect fraud across diverse scenarios.

Training of models, such as artificial intelligence models, is necessarily rooted in computer technology and improves fraud detection technology by using training data to train such models and thereafter applying the models to new inputs to make inferences on the likelihood of fraud. Here, the new inputs can include real-time or historical embeddings generated during verification requests, along with associated metadata such as user PII, transaction information, or behavioral data. The trained machine learning model can identify patterns of fraudulent behavior, such as similarities to embeddings in flagged fraud cases or inconsistencies in metadata linked to multiple verification attempts.

Such training involves complex processing that typically requires significant computational resources, extended training periods, and large datasets, often performed on massive server systems. Training the models may involve logistic regression, forward/backward propagation, and optimization algorithms that adjust model parameters based on input embeddings, metadata, and expected outcomes (e.g., flagged fraud cases or verified identities). This framework enables the models to generalize effectively, applying learned patterns to new and unseen verification requests to make predictions based on the weights and scores adjusted during training. Such training improves fraud detection accuracy by reducing false positives and negatives and increasing the performance of identifying fraud across both short-term and long-term contexts, leveraging embeddings and metadata to enhance decision-making.

While the described dual-index system offers significant advantages in terms of efficiency and scalability, in some cases, the indexing system uses a vector database in combination with a conventional database that provides an effective framework for identity verification.

In some cases, all embeddings are stored within a single index rather than being split into dynamic and static indexes. The single index is updated incrementally with each verification request, maintaining a unified repository of embeddings. This design avoids the need to manage overlapping data between two separate indexes, simplifying the architecture. The single index can also support hierarchical updates, where embeddings are tagged with timestamps or priority levels, allowing the system to differentiate between recent and historical data during the comparison process without physically separating them into different indexes. In some cases, the single index enables the features described herein for the first and/or the second index, such as storing embeddings based on a certain time period.

To enhance identity verification capabilities, the system combines a vector database (storing embeddings) with a conventional database (storing PII, other metadata, and/or the like). In this setup, the vector database stores representations of biometric or other data as embeddings in a multidimensional space, while the conventional database stores corresponding PII, such as names, dates of birth, addresses, or transaction histories. This combination enables cross-referencing during verification processes. For example, the system first compares a newly generated vector embedding with those in the single index to identify similar embeddings. The results are then cross-referenced with the conventional database to validate metadata consistency, such as checking if the same face embedding is associated with conflicting names or geographic locations.

A single-index approach, combined with the integration of conventional and vector databases, provides simplified management where developers and operators need to maintain only one index for embeddings, reducing system complexity and maintenance costs, as well as flexible updates allowing incremental additions without the need for batch processing or managing overlapping data structures.

The single-index approach enables scalable architecture where the single index can easily grow in size, supported by the cross-referencing capabilities of the conventional database, ensuring efficient identity verification even as the dataset expands. The single-index approach also enables enhanced accuracy by leveraging both vector embeddings and conventional metadata. The system improves its ability to detect fraud and validate identities, offering robust and precise verification.

Updating of the First and Second Indexes

Figure 3:
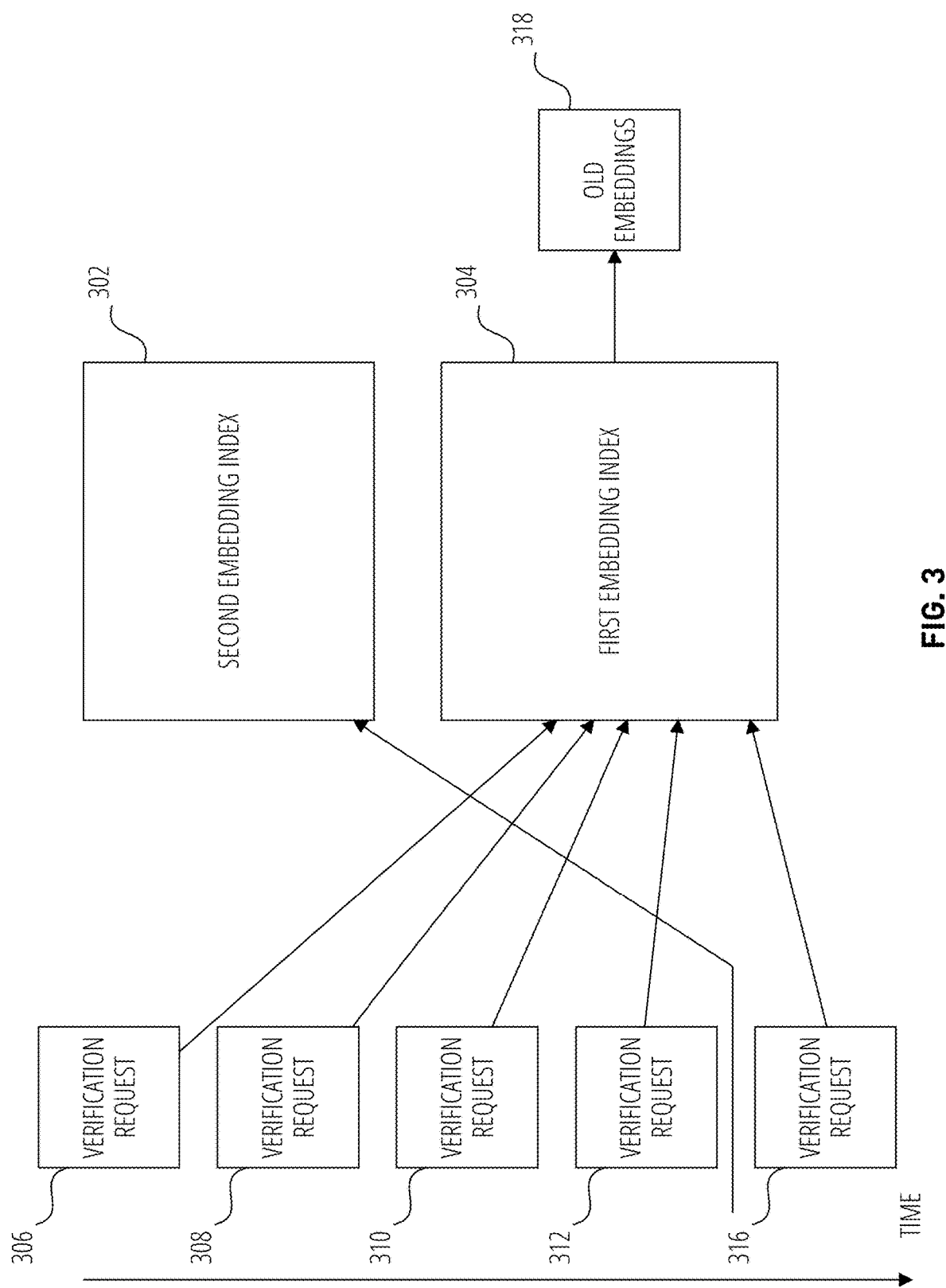
FIG. 3 illustrates an architectural diagram for updating the indexes, according to some examples.

FIG. 3 illustrates an architectural diagram for updating the indexes, according to some examples. FIG. 3 illustrates the interaction and operational distinctions between a first embedding index (304) and a second embedding index (302), highlighting their respective update mechanisms, data management strategies, and roles within the system. This figure provides a depiction of how the two indexes balance real-time responsiveness with long-term data storage and analysis to optimize fraud detection and identity verification processes.

The first embedding index (304) can apply real-time updates and responsiveness. The first index is updated in real time with each new verification request submitted to the system. For example, Verification requests 306, 308, 310, 312, and 316 are processed sequentially, and their corresponding embeddings are immediately added to the first index upon generation. This real-time updating ensures that the first index contains the most recent embeddings, enabling the system to perform instantaneous comparisons against the latest user data.

The first index is optimized for detecting short-term patterns and recent activity, such as identifying a user submitting multiple verification requests in quick succession or detecting anomalies in real-time transactions. It provides rapid detection of fraud scenarios where recency is critical, such as account takeover attempts or repeated submissions from a fraudster within minutes or hours.

To maintain efficiency, the first index employs a mechanism for removing old embeddings (e.g., 318). This ensures that the index remains lightweight and focused on recent data. If the embedding of verification request 306 was added first and the system reaches a threshold for the number of stored embeddings or a time limit (e.g., 24 hours), embedding of verification request 306 may be removed to make room for embedding of verification request 316.

The second embedding index (302) may be updated in batches. In this example, unlike the first index, the second index does not update with every verification request. Instead, it waits until certain conditions are met, such as a threshold number of requests (e.g., verification requests 306, 308, 310, 312) and updates in batches once the threshold is reached, or based on time triggers where the second index updates after a predefined time period (e.g., once a week), regardless of the number of collected embeddings.

Relationship Between the First and Second Indexes

Figure 4:
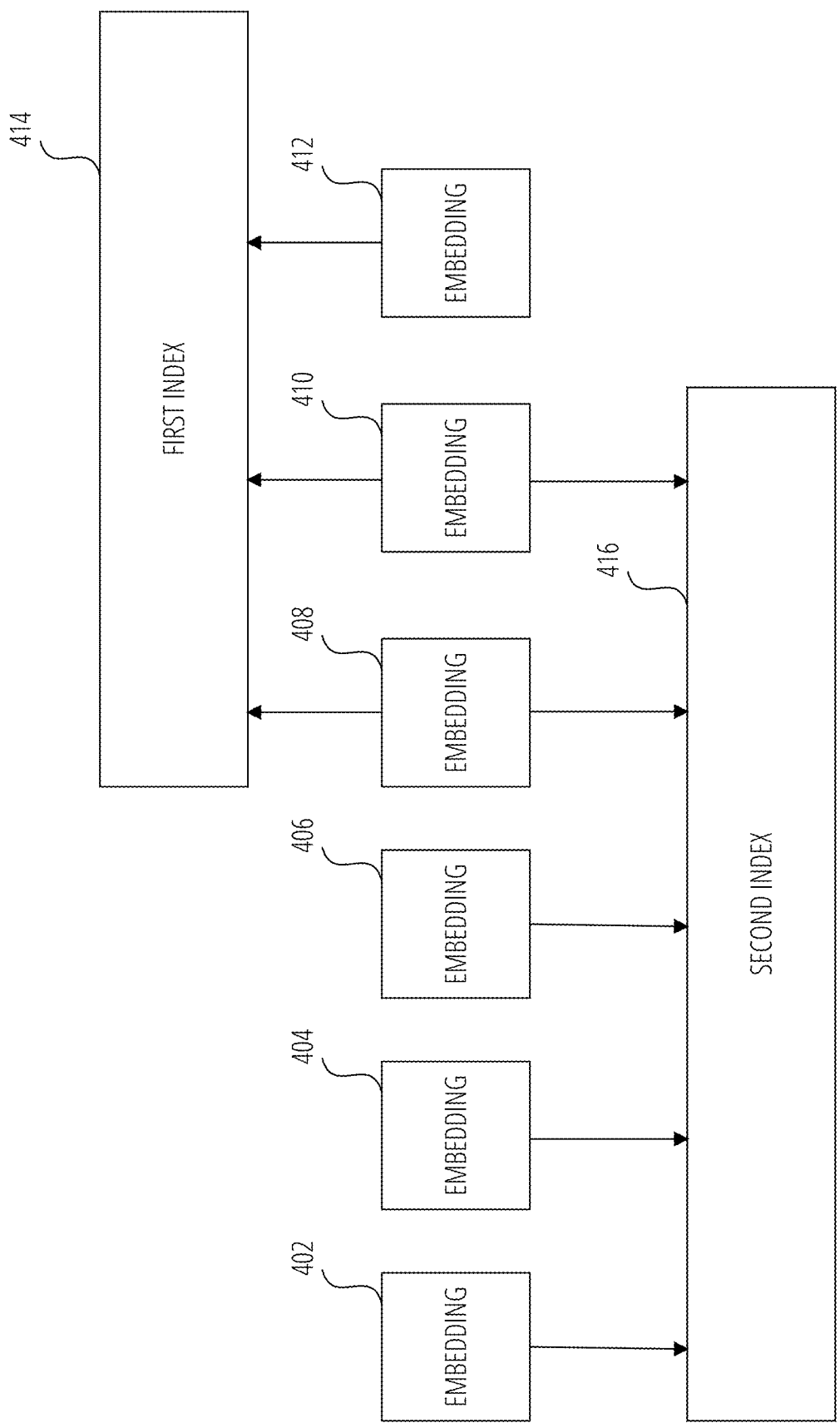
FIG. 4 illustrates the relationship between a first index and a second index within the system, focusing on how embeddings are distributed across these two indexes, according to some examples.

FIG. 4 illustrates the relationship between a first index and a second index within the system, focusing on how embeddings are distributed across these two indexes, according to some examples. The figure emphasizes that some embeddings are exclusive to one index, while others are shared between both indexes, reflecting a design that balances real-time responsiveness and comprehensive historical analysis in fraud detection or identity verification workflows.

In this example, embedding 412 is only present in the first index. This embedding represents recently generated data from identity verification requests or interactions.

The first index is optimized for real-time or near-real-time comparisons, enabling quick detection of anomalies or matches associated with the most recent user activity. By focusing on recency, the first index ensures high efficiency, limiting the volume of data to only the most recent embeddings.

These embeddings remain in the first index for a limited time or until newer embeddings replace them, depending on the index's update and removal policies. For example, 412 may be removed after exceeding a predefined time threshold or after newer embeddings are added.

Embeddings 402, 404, and 406 are only present in the second index. These embeddings represent historical data, retained for long-term analysis and detection of patterns spanning extended periods. The second index acts as a comprehensive repository, capturing embeddings from all verification requests since the system's inception or over a long timeframe. These embeddings are stored for extended durations, which in some circumstances may not removed.

Embeddings 408 and 410 exist in both the first and second indexes. By retaining these embeddings in both indexes, the system ensures they are readily available for real-time detection while simultaneously contributing to the broader historical dataset.

The shared embeddings 408, 410 between the first index (414) and the second index (416) result from an overlap in the data retention periods rather than an intentional duplication for different purposes. The first index is updated in real-time and maintains recent embeddings, such as a week's worth of data, to support immediate and responsive analysis. In contrast, the second index is a comprehensive repository, containing all historical embeddings, including those that overlap with the recent data stored in the first index.

The overlap allows the system to efficiently handle both real-time needs and long-term analyses. For example, embeddings 408 and 410, which fall within the first index's retention window, are also part of the second index as part of the historical dataset. Over time, as the first index reaches its capacity or updates with newer data, embeddings 408 and 410 are removed from the first index while remaining permanently in the second index.

Data Communications Architecture

Figure 5:
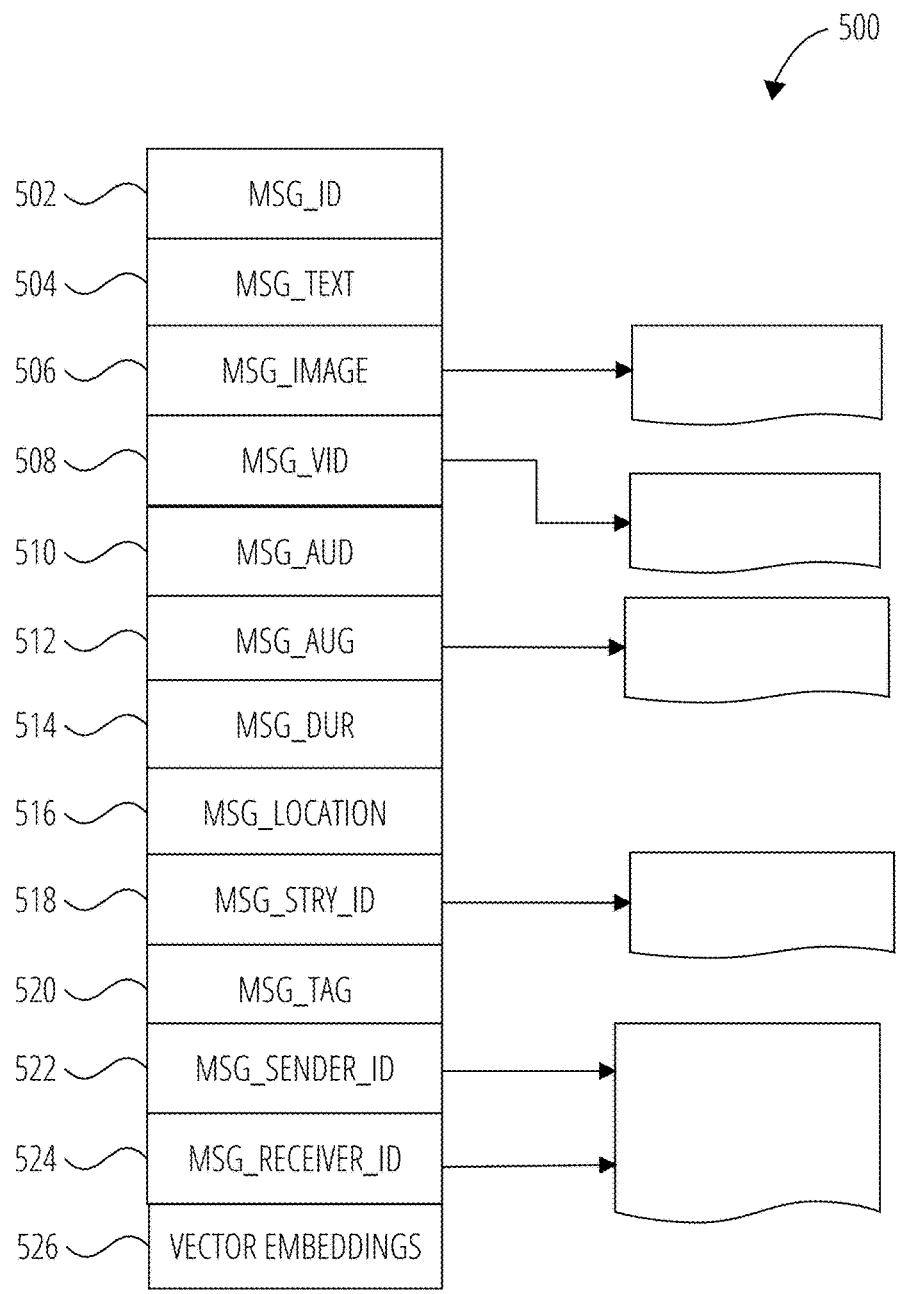
FIG. 5 is a diagrammatic representation of a message, according to some examples.

FIG. 5 is a schematic diagram illustrating a structure of a message 500, according to some examples, generated by an indexing system client for communication to a further indexing system client via the indexing system. The content of a particular message 500 is used to populate a message table stored within the database, accessible by the indexing system. Similarly, the content of a message 500 is stored in memory as "in-transit" or "in-flight" data of the user system or the indexing system. A message 500 is shown to include the following example components:

Message identifier 502: a unique identifier that identifies the message 500.

Message text payload 504: text, to be generated by a user via a user interface of the user system, and that is included in the message 500.

Message image payload 506: image data, captured by a camera component of a user system or retrieved from a memory component of a user system, and that is included in the message 500. Image data for a sent or received message 500 may be stored in the image table.

Message video payload 508: video data, captured by a camera component or retrieved from a memory component of the user system, and that is included in the message 500. Video data for a sent or received message 500 may be stored in the image table.

Message audio payload 510: audio data, captured by a microphone or retrieved from a memory component of the user system, and that is included in the message 500.

Message augmentation data 512: augmentation data (e.g., filters, stickers, or other annotations or enhancements) that represents augmentations to be applied to message image payload 506, message video payload 508, or message audio payload 510 of the message 500. Augmentation data for a sent or received message 500 may be stored in the augmentation table.

Message duration parameter 514: parameter value indicating, in seconds, the amount of time for which content of the message (e.g., the message image payload 506, message video payload 508, message audio payload 510) is to be presented or made accessible to a user via the indexing system client.

Message geolocation parameter 516: geolocation data (e.g., latitudinal and longitudinal coordinates) associated with the content payload of the message. Multiple message geolocation parameter 516 values may be included in the payload, each of these parameter values being associated with respect to content items included in the content (e.g., a specific image within the message image payload 506, or a specific video in the message video payload 508).

Message identifier 518: identifier values identifying one or more content collections with which a particular content item in the message image payload 506 of the message 500 is associated. For example, multiple images within the message image payload 506 may each be associated with multiple content collections using identifier values.

Message tag 520: each message 500 may be tagged with multiple tags, each of which is indicative of the subject matter of content included in the message payload. For example, where a particular image included in the message image payload 506 depicts an animal (e.g., a lion), a tag value may be included within the message tag 520 that is indicative of the relevant animal. Tag values may be generated manually, based on user input, or may be automatically generated using, for example, image recognition.

Message sender identifier 522: an identifier (e.g., a messaging system identifier, email address, or device identifier) indicative of a user of the user system on which the message 500 was generated and from which the message 500 was sent.

Message receiver identifier 524: an identifier (e.g., a messaging system identifier, email address, or device identifier) indicative of a user of the user system to which the message 500 is addressed.

Vector embeddings 526: embeddings generated to represent key features of the message's content (e.g., text, image, or audio data) in a multidimensional space, enabling efficient comparison and analysis for tasks such as topic identification, contextual tagging, or fraud detection.

The contents (e.g., values) of the various components of message 500 may be pointers to locations in tables within which content data values are stored. For example, an image value in the message image payload 506 may be a pointer to (or address of) a location within an image table. Similarly, values within the message video payload 508 may point to data stored within an image or video table, values stored within the message augmentation data 512 may point to data stored in an augmentation table, and values stored within the message sender identifier 522 and the message receiver identifier 524 may point to user records stored within an entity table.

Machine Architecture

Figure 6:
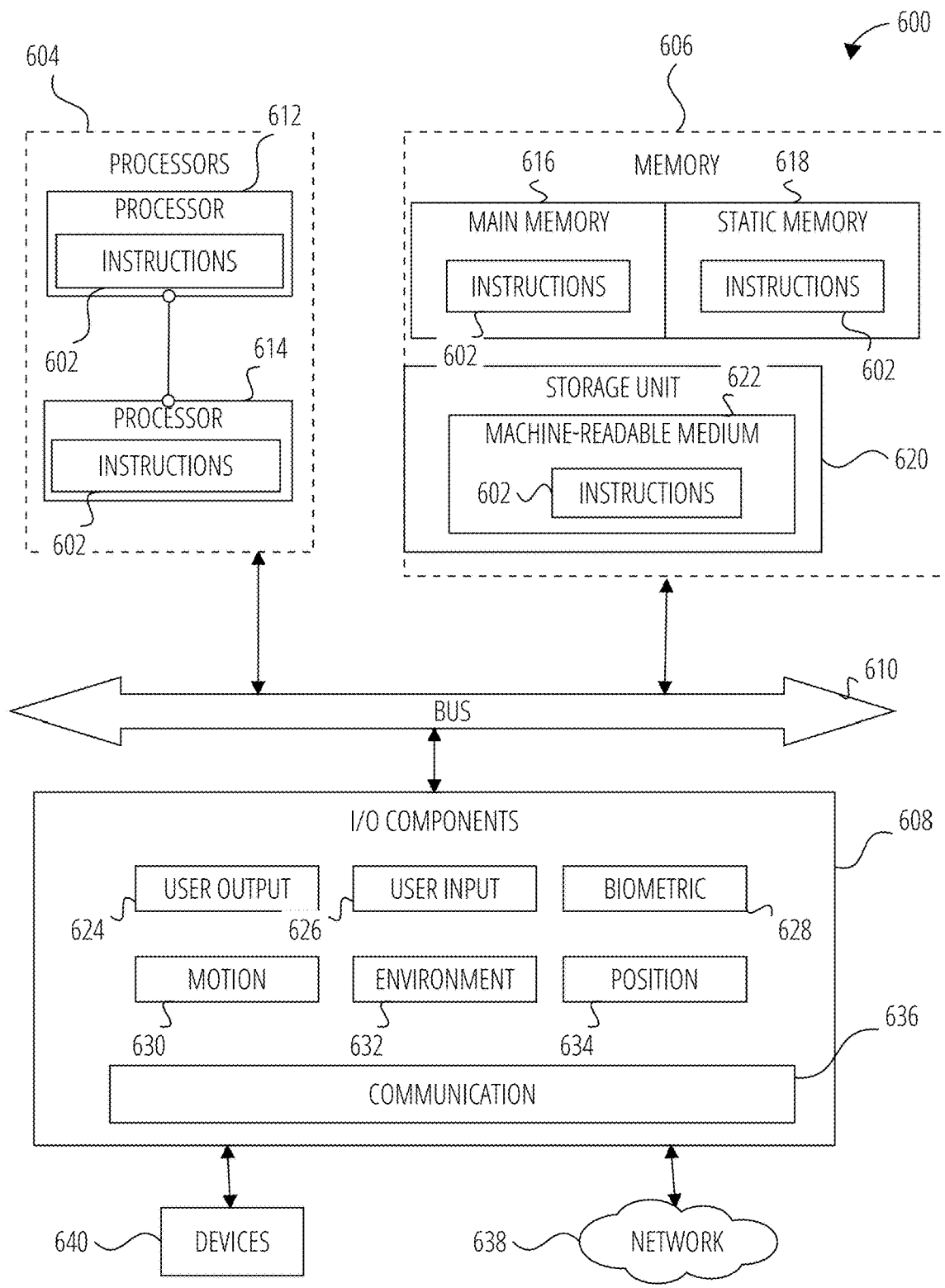
FIG. 6 is a diagrammatic representation of a machine in the form of a computer system within which a set of instructions may be executed to cause the machine to perform any one or more of the methodologies discussed herein, according to some examples.

FIG. 6 is a diagrammatic representation of the machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the methods described herein. The instructions 602 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. The machine 600, for example, may comprise the user system or any one of multiple server devices forming part of the indexing system. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 606, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 630 include acceleration sensor components (e.g., accelerometer), gravitation sensor components, rotation sensor components (e.g., gyroscope).

The environmental components 632 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system may have a camera system comprising, for example, front cameras on a front surface of the user system and rear cameras on a rear surface of the user system. The front cameras may, for example, be used to capture still images and video of a user of the user system (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system may also include a 360° camera for capturing 360° photographs and videos.

Further, the camera system of the user system may include dual rear cameras (e.g., a primary camera as well as a depth-sensing camera), or even triple, quad or penta rear camera configurations on the front and rear sides of the user system. These multiple cameras systems may include a wide camera, an ultra-wide camera, a telephoto camera, a macro camera, and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 600 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

Software Architecture

Figure 7:
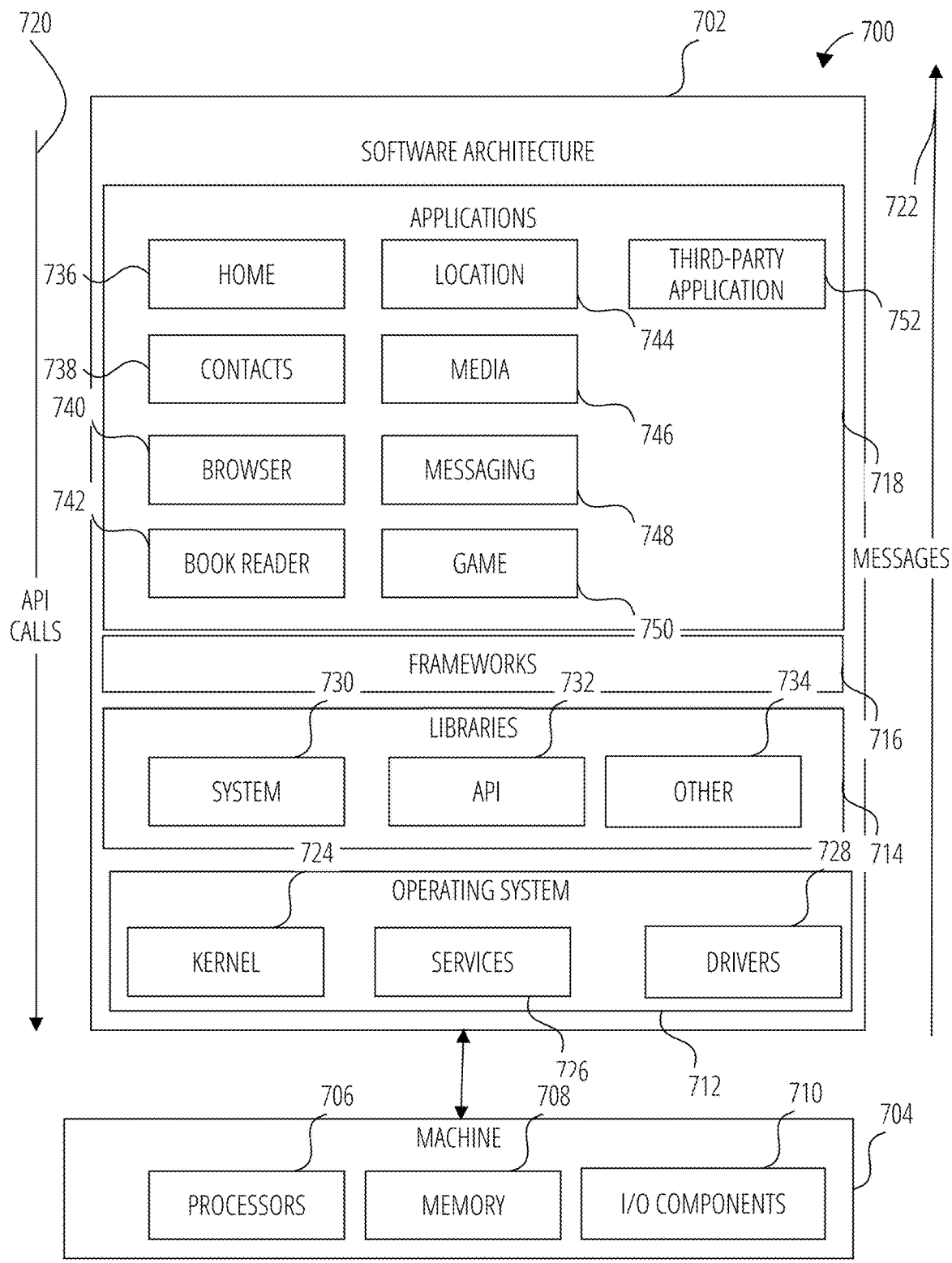
FIG. 7 is a block diagram showing a software architecture within which examples may be implemented.

FIG. 7 is a block diagram 700 illustrating a software architecture 702, which can be installed on any one or more of the devices described herein. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such as an operating system 712, libraries 714, frameworks 716, and applications 718. Operationally, the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 714 provide a common low-level infrastructure used by the applications 718. The libraries 714 can include system libraries 730 (e.g., C standard library) that provide functions such as memory allocation functions, string manipulation functions, mathematic functions, and the like. In addition, the libraries 714 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 714 can also include a wide variety of other libraries 734 to provide many other APIs to the applications 718.

The frameworks 716 provide a common high-level infrastructure that is used by the applications 718. For example, the frameworks 716 provide various graphical user interface (GUI) functions, high-level resource management, and high-level location services. The frameworks 716 can provide a broad spectrum of other APIs that can be used by the applications 718, some of which may be specific to a particular operating system or platform.

In an example, the applications 718 may include a home application 736, a contacts application 738, a browser application 740, a book reader application 742, a location application 744, a media application 746, a messaging application 748, a game application 750, and a broad assortment of other applications such as a third-party application 752. The applications 718 are programs that execute functions defined in the programs. Various programming languages can be employed to create one or more of the applications 718, structured in a variety of manners, such as object-oriented programming languages (e.g., Objective-C, Java, or C++) or procedural programming languages (e.g., C or assembly language). In a specific example, the third-party application 752 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 752 can invoke the API calls 720 provided by the operating system 712 to facilitate functionalities described herein.

Machine-Learning Pipeline

Figure 9:
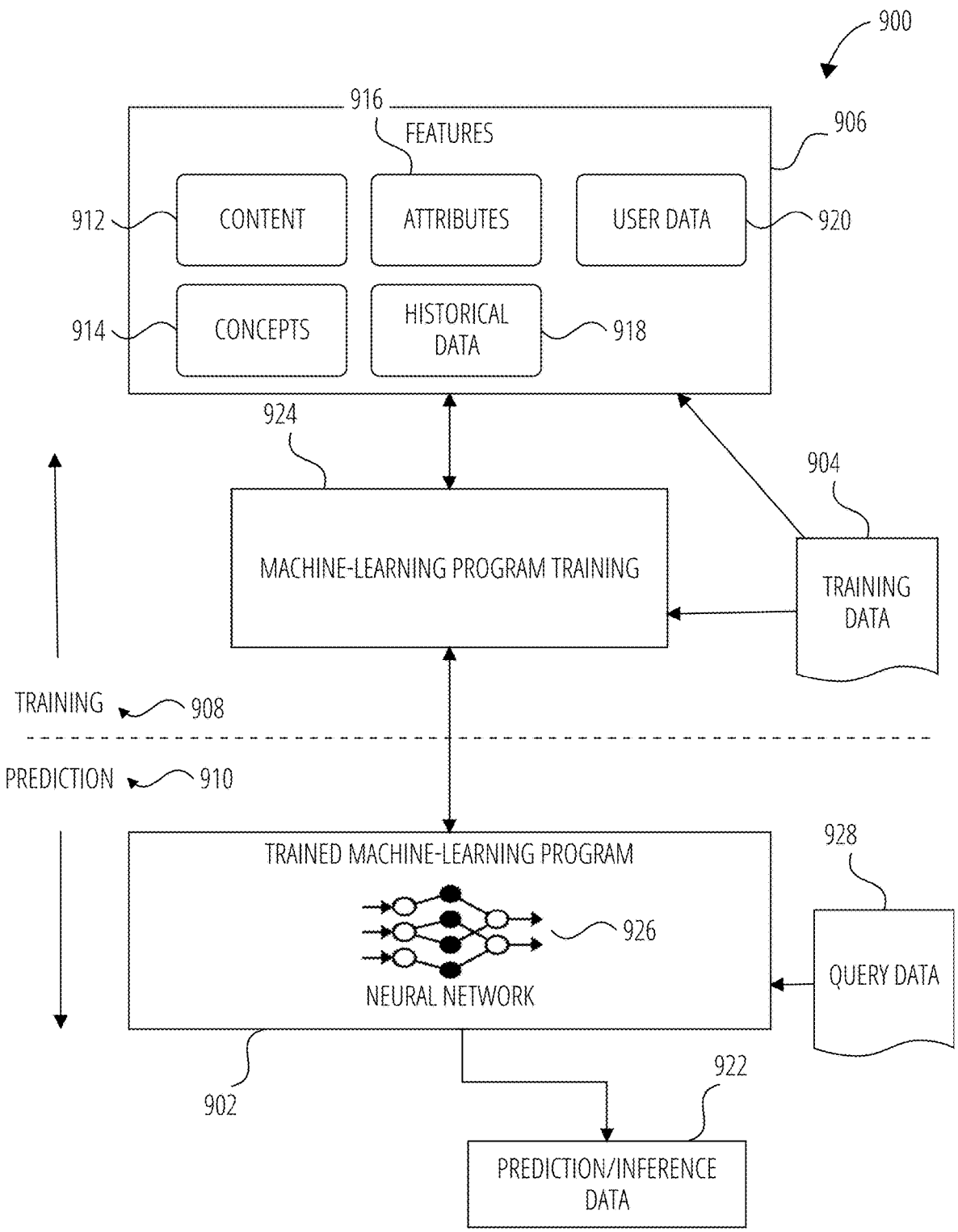
FIG. 9 illustrates training and use of a machine-learning program, according to some examples.

FIG. 9 is a flowchart depicting a machine-learning pipeline 900, according to some examples. The machine-learning pipelines 900 may be used to generate a trained model, for example the trained machine-learning program 902 of FIG. 9, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 8:
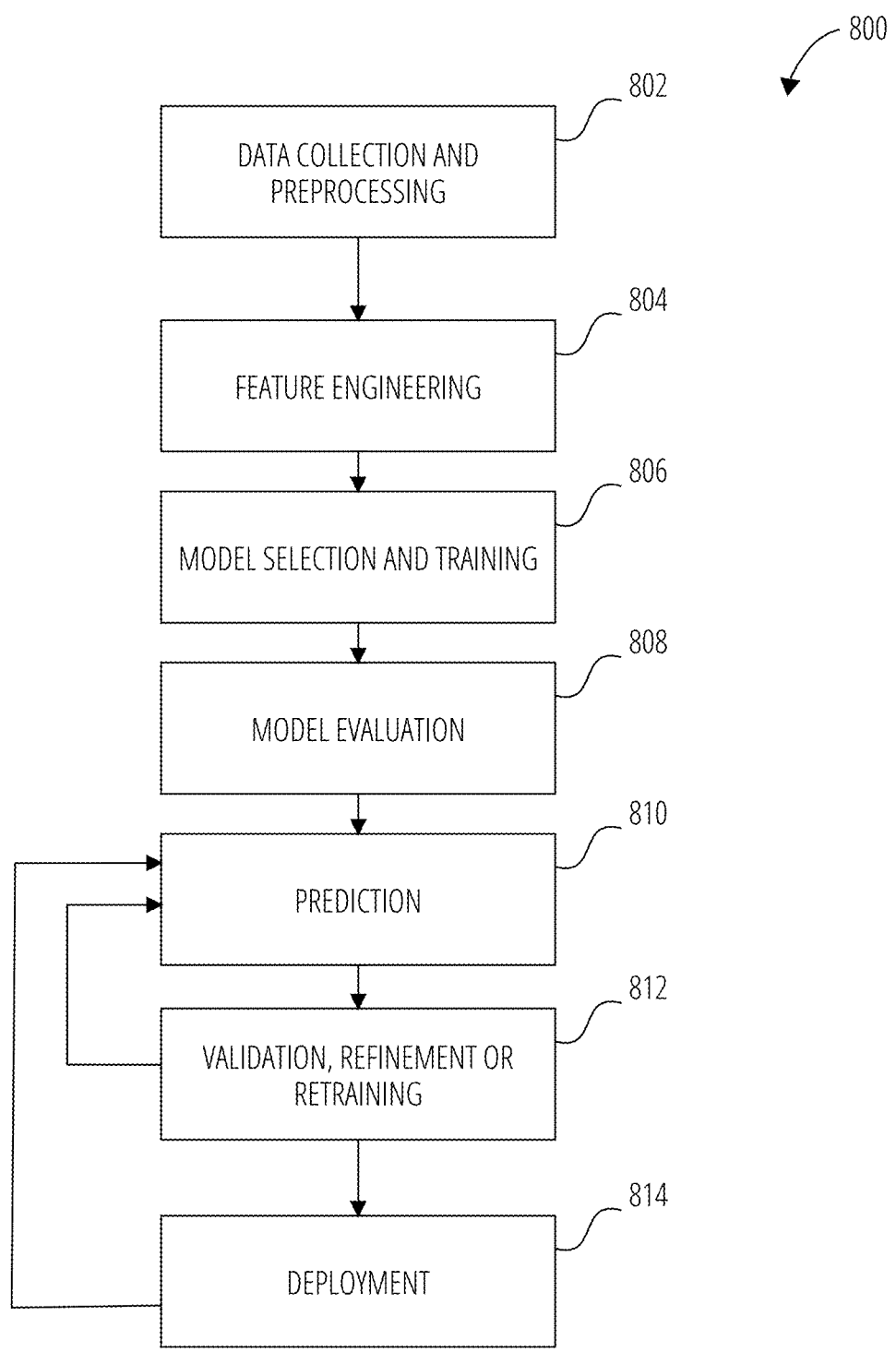
FIG. 8 illustrates a machine-learning pipeline, according to some examples.

Generating a trained machine-learning program 902 may include multiple types of phases that form part of the machine-learning pipeline 900, including for example the following phases 800 illustrated in FIG. 8:

Data collection and preprocessing 802: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.

Feature engineering 804: This may include selecting and transforming the training data 904 to create features that are useful for predicting the target variable. Feature engineering may include (1) receiving features 906 (e.g., as structured or labeled data in supervised learning) and/or (2) identifying features 906 (e.g., unstructured or unlabeled data for unsupervised learning) in training data 904.

Model selection and training 806: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.

Model evaluation 808: This may include evaluating the performance of a trained model (e.g., the trained machine-learning program 902) on a separate testing dataset. This can help determine if the model is overfitting or underfitting and if it is suitable for deployment.

Prediction 810: This involves using a trained model (e.g., trained machine-learning program 902) to generate predictions on new, unseen data.

Validation, refinement or retraining 812: This may include updating a model based on feedback generated from the prediction phase, such as new data or user feedback.

Deployment 814: This may include integrating the trained model (e.g., the trained machine-learning program 902) into a larger system or application, such as a web service, mobile app, or IoT device. This can involve setting up APIs, building a user interface, and ensuring that the model is scalable and can handle large volumes of data.

FIG. 9 illustrates two example phases, namely a training phase 908 (part of the model selection and trainings 806) and a prediction phase 910 (part of prediction 810). Prior to the training phase 908, feature engineering 804 is used to identify features 906. This may include identifying informative, discriminating, and independent features for the effective operation of the trained machine-learning program 902 in pattern recognition, classification, and regression. In some examples, the training data 904 includes labeled data, which is known data for pre-identified features 906 and one or more outcomes.

Each of the features 906 may be a variable or attribute, such as individual measurable property of a process, article, system, or phenomenon represented by a data set (e.g., the training data 904). Features 906 may also be of different types, such as numeric features, strings, vectors, matrices, encodings, and graphs, and may include one or more of content 912, concepts 914, attributes 916, historical data 918 and/or user data 920, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 908, the machine-learning pipeline 900 uses the training data 904 to find correlations among the features 906 that affect a predicted outcome or prediction/inference data 922.

With the training data 904 and the identified features 906, the trained machine-learning program 902 is trained during the training phase 908 during machine-learning program training 924. The machine-learning program training 924 appraises values of the features 906 as they correlate to the training data 904. The result of the training is the trained machine-learning program 902 (e.g., a trained or learned model).

Further, the training phase 908 may involve machine learning, in which the training data 904 is structured (e.g., labeled during preprocessing operations), and the trained machine-learning program 902 implements a relatively simple neural network 926 capable of performing, for example, classification and clustering operations. In other examples, the training phase 908 may involve deep learning, in which the training data 904 is unstructured, and the trained machine-learning program 902 implements a deep neural network 926 that is able to perform both feature extraction and classification/clustering operations.

A neural network 926 may, in some examples, be generated during the training phase 908, and implemented within the trained machine-learning program 902. The neural network 926 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 926 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 926 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 908, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 926 is iteratively trained by adjusting model parameters to minimize a specific loss function or maximize a certain objective. The system can continue to train the neural network 926 by adjusting parameters based on the output of the validation, refinement, or retraining block 812, and rerun the prediction 810 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 926 even after deployment 814 of the neural network 926. The neural network 926 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 910, the trained machine-learning program 902 uses the features 906 for analyzing query data 928 to generate inferences, outcomes, or predictions, as examples of a prediction/inference data 922. For example, during prediction phase 910, the trained machine-learning program 902 is used to generate an output. Query data 928 is provided as an input to the trained machine-learning program 902, and the trained machine-learning program 902 generates the prediction/inference data 922 as output, responsive to receipt of the query data 928. Query data can include a prompt, such as a user entering a textual question or speaking a question audibly. In some cases, the system generates the query based on an interaction function occurring in the system, such as a user interacting with a virtual object, a user sending another user a question in a chat window, or an object detected in a camera feed.

In some examples the trained machine-learning program 902 may be a generative AI model. Generative AI is a term that may refer to any type of artificial intelligence that can create new content from training data 904. For example, generative AI can produce text, images, video, audio, code or synthetic data that are similar to the original data but not identical.

Some of the techniques that may be used in generative AI are:
  Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
  Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
  Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
  Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.
  Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 922 that is output include trend assessment and predictions, translations, summaries, image or video recognition and categorization, natural language processing, face recognition, user sentiment assessments, advertisement targeting and optimization, voice recognition, or media content generation, recommendation, and personalization.

Examples

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; and at least one memory component storing instructions that, when executed by the at least one processor performs operations comprising: receiving an image of a user for an identity verification process of the user; generating a vector embedding for a face within the image using a machine learning model, the vector embedding representing the image as at least a point in a multidimensional space; comparing the vector embedding with at least two embedding repositories to determine a likelihood of fraud by: comparing the vector embedding with a first index of embeddings, the first index being updated at a first time interval; comparing the vector embedding with a second index of embeddings, the second index being updated at a second time interval, the first index and second index having at least a subset of the same points in the multidimensional space; and determining a characteristic of potential fraud based on the comparison of the vector embeddings with the first index and second index; and outputting an identity verification result based on the likelihood of fraud.

In Example 2, the subject matter of Example 1 includes, wherein the vector embedding represents the face as a single point in a multidimensional space, the point corresponding to a unique numerical representation of facial features of the face, wherein the comparing of the vector embedding with the first and second index of embeddings comprises comparing the unique numerical representation of the facial features of the vector embedding with unique numerical representations of the facial features in the first and second index.

In Example 3, the subject matter of Examples 1-2 includes, wherein the vector embedding represents the face as a plurality of points in a multidimensional space, each point capturing one or more variations in the face, wherein the comparing of the vector embedding with the first and second index of embeddings comprises comparing each point of the vector embedding with corresponding points in the first and second index.

In Example 4, the subject matter of Examples 1-3 includes, wherein the vector embedding is generated using an encoder of the machine learning model, the encoder extracting features from the face within the image and encoding the features into a fixed-length numerical vector.

In Example 5, the subject matter of Examples 1-4 includes, wherein the machine learning model is trained to generate vector embeddings such that embeddings representing similar faces are positioned closer together in the multidimensional space than embeddings representing dissimilar faces.

In Example 6, the subject matter of Examples 1-5 includes, wherein the first time interval is shorter than the second time interval, wherein the second index stores a greater number of embeddings and spans a larger time frame than the first index.

In Example 7, the subject matter of Examples 1-6 includes, wherein the first index stores up to a maximum predefined number of recent vector embeddings, wherein the first index prioritizes recent vector embeddings for storage and removes older embeddings when the total number of stored embeddings exceeds the maximum predefined number.

In Example 8, the subject matter of Examples 1-7 includes, wherein comparing the vector embedding with the first and second index comprises computing a similarity between the vector embedding and each embedding in the first index and the second index.

In Example 9, the subject matter of Example 8 includes,) the vector embedding and the second index, wherein closer angles indicate higher similarity.

In Example 10, the subject matter of Examples 1-9 includes, wherein comparing the vector embedding with the first index that was updated at the first time interval applies a different algorithm than comparing the vector embedding with the second index that was updated at the second time interval.

In Example 11, the subject matter of Examples 1-10 includes, wherein the comparison between the vector embedding with the first index results in a first set of embeddings, and the comparison between the vector embedding with the second index results in a second set of embeddings, wherein the characteristic of potential fraud is determined based on the first and second set of embeddings.

In Example 12, the subject matter of Example 11 includes, the operations further comprise combining the first and set set of embeddings into a unified set of embeddings by removing a certain number of embeddings beyond a certain distance away from the point for the vector embedding in multidimensional space.

In Example 13, the subject matter of Examples 1-12 includes, wherein determining the characteristic of potential fraud is further based on metadata associated with the vector embedding.

In Example 14, the subject matter of Examples 1-13 includes, wherein determining the characteristic of potential fraud is further based on contextual data associated with identity verification data received during the identity verification process.

In Example 15, the subject matter of Examples 1-14 includes, wherein the operations further comprise: applies a clustering algorithm to refine embeddings retrieved from the comparison between the vector embedding with the first index and the second index, the clustering algorithm grouping embeddings into clusters based on their spatial proximity in the multidimensional space such that embeddings within a cluster have higher similarity to each other than embeddings in different clusters, wherein determining the characteristic of potential fraud is based on the clusters.

In Example 16, the subject matter of Examples 1-15 includes, wherein the comparing of the vector embedding with the second index is in response to an identification of a match between the vector embedding with an embedding in the first index.

In Example 17, the subject matter of Examples 1-16 includes, wherein determining the characteristic of potential fraud includes: cross-referencing metadata associated with the matched embeddings that includes personal identifiable information (PII) data to identify inconsistencies or suspicious patterns indicative of the characteristic of potential fraud.

In Example 18, the subject matter of Example 17 includes, wherein PII data linked to the embeddings is stored in a separate database from the database storing the embeddings.

In Example 19, the subject matter of Examples 17-18 includes, wherein the PII is stored in a non-vector database that is separate from a vector database storing the vector embeddings.

In Example 20, the subject matter of Examples 17-19 includes, wherein the PII is stored in the same database as the vector embeddings.

In Example 21, the subject matter of Examples 1-20 includes, the operations further comprise: receiving Personally Identifiable Information (PII) associated with the user; and comparing the PII of the user with PII associated with embeddings of the first and second indexes, wherein determining the characteristic of potential fraud is further based on the comparison between the PII of the user with PII associated with the embeddings of the first and second indexes.

In Example 22, the subject matter of Examples 1-21 includes, wherein the likelihood of fraud is determined on the basis of detecting discrepancies within PII associated with the vector embedding and vector embeddings of the first and second indexes.

In Example 23, the subject matter of Examples 1-22 includes, wherein comparing the vector embedding with the at least two embedding repositories is performed by a vector database management sub-system, wherein the operations further comprise in response to finding similar vector embeddings as a result of the comparison, transmitting metadata associated with the vector embeddings to the user.

Example 24 is a method comprising: receiving an image of a user for an identity verification process of the user; generating a vector embedding for a face within the image using a machine learning model, the vector embedding representing the image as at least a point in a multidimensional space; comparing the vector embedding with at least two embedding repositories to determine a likelihood of fraud by: comparing the vector embedding with a first index of embeddings, the first index being updated at a first time interval; comparing the vector embedding with a second index of embeddings, the second index being updated at a second time interval, the first index and second index having at least a subset of the same points in the multidimensional space; and determining a characteristic of potential fraud based on the comparison of the vector embeddings with the first index and second index; and outputting an identity verification result based on the likelihood of fraud.

Example 25 is a non-transitory computer-readable storage medium storing instructions that, when executed by at least one processor, cause the at least one processor to perform operations comprising: receiving an image of a user for an identity verification process of the user; generating a vector embedding for a face within the image using a machine learning model, the vector embedding representing the image as at least a point in a multidimensional space; comparing the vector embedding with at least two embedding repositories to determine a likelihood of fraud by: comparing the vector embedding with a first index of embeddings, the first index being updated at a first time interval; comparing the vector embedding with a second index of embeddings, the second index being updated at a second time interval, the first index and second index having at least a subset of the same points in the multidimensional space; and determining a characteristic of potential fraud based on the comparison of the vector embeddings with the first index and second index; and outputting an identity verification result based on the likelihood of fraud.

Example 26 is a system comprising: at least one processor; and at least one memory component storing instructions that, when executed by the at least one processor performs operations comprising: receiving a data object; generating a vector embedding for said data object using a machine learning model, the vector embedding representing the data object as at least a point in a multidimensional space; comparing the vector embedding with at least two embedding repositories by: comparing the vector embedding with a first index of embeddings, the first index being updated at a first time interval; comparing the vector embedding with a second index of embeddings, the second index being updated at a second time interval, the first index and second index having at least a subset of the same points in the multidimensional space; and determining similar vector embeddings within the first index and second index based on predefined similarity threshold; and in response to finding similar vector embeddings returning the similar vector embeddings; and in response to non-finding similar embeddings returning an empty query.

Example 26 is a system according to the subject matter of Examples 1-25, wherein the operations of comparing the vector embedding with at least two embedding repositories is performed by a vector database management sub-system; And wherein the operations further comprise in response to finding similar vector embeddings returning metadata associated with the vector embeddings, wherein the metadata is stored by non-vector database management subsystem.

Example 27 is a system according to the subject matter of Examples 1-26, wherein the data object is image data depicting face of a user for an identity verification process of the user; And performs operations comprising further comprising determining a characteristic of potential fraud based on the comparison of the vector embeddings with the first index and second index; and Outputting an identity verification result based on the likelihood of fraud.

Example 28 is a system according to the subject matter of Examples 1-27, wherein the likelihood of fraud is determined on the basis of detecting discrepancies within the PII associated with similar vector embeddings.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-29.

Example 31 is a system to implement of any of Examples 1-30.

Example 32 is a method to implement of any of Examples 1-31.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine. "User device" refers, for example, to a device accessed, controlled or owned by a user and with which the user interacts with to perform an action or interaction on the user device, including an interaction with other users or computer systems.

CONCLUSION

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
   at least one processor; and
   at least one memory component storing instructions that, when executed by the at least one processor performs operations comprising:
   receiving an image of a user for an identity verification process of the user;
   generating a vector embedding for one or more visual features of an individual within the image using a machine learning model, the vector embedding representing the image as at least a point in a multidimensional space;
   comparing the vector embedding with at least two embedding repositories to determine a likelihood of fraud by:
   comparing the vector embedding with a first index of embeddings, the first index being updated at a first time interval;
   comparing the vector embedding with a second index of embeddings, the second index being updated at a second time interval, the first index and second index having at least a subset of the same points in the multidimensional space; and
   determining a characteristic of potential fraud based on the comparison of the vector embeddings with the first index and second index; and
   outputting an identity verification result based on the likelihood of fraud,
   wherein the vector embedding represents the one or more visual features of the individual as a single point in a multidimensional space, the point corresponding to a unique numerical representation of facial features of the one or more visual features of the individual, wherein the comparing of the vector embedding with the first and second index of embeddings comprises comparing the unique numerical representation of the facial features of the vector embedding with unique numerical representations of the facial features in the first and second index.

2. The system of claim 1, wherein the vector embedding represents the one or more visual features of the individual as a plurality of points in a multidimensional space, each point capturing one or more variations in the one or more visual features of the individual, wherein the comparing of the vector embedding with the first and second index of embeddings comprises comparing each point of the vector embedding with corresponding points in the first and second index.

3. The system of claim 1, wherein the vector embedding is generated using an encoder of the machine learning model, the encoder extracting features from the one or more visual features of the individual within the image and encoding the features into a fixed-length numerical vector.

4. The system of claim 1, wherein the machine learning model is trained to generate vector embeddings such that embeddings representing similar visual features of other individuals are positioned closer together in the multidimensional space than embeddings representing dissimilar visual features of the other individuals.

5. The system of claim 1, wherein the machine learning model is trained to generate vector embeddings such that embeddings representing similar faces are positioned closer together in the multidimensional space than embeddings representing dissimilar faces.

6. The system of claim 1, wherein the first index stores up to a maximum predefined number of recent vector embeddings, wherein the first index prioritizes recent vector embeddings for storage and removes older embeddings when the total number of stored embeddings exceeds the maximum predefined number.

7. The system of claim 1, wherein comparing the vector embedding with the first and second index comprises computing a similarity between the vector embedding and each embedding in the first index and the second index.

8. The system of claim 7, wherein computing the similarity comprises applying a cosine similarity metric that measures the cosine of an angle between two vectors in the multidimensional space between (1) the vector embedding and the first index and (2) the vector embedding and the second index, wherein closer angles indicate higher similarity.

9. The system of claim 1, wherein comparing the vector embedding with the first index that was updated at the first time interval applies a different algorithm than comparing the vector embedding with the second index that was updated at the second time interval.

10. The system of claim 1, wherein the comparison between the vector embedding with the first index results in a first set of embeddings, and the comparison between the vector embedding with the second index results in a second set of embeddings, wherein the characteristic of potential fraud is determined based on the first and second set of embeddings.

11. The system of claim 10, the operations further comprise combining the first and set set of embeddings into a unified set of embeddings by removing a certain number of embeddings beyond a certain distance away from the point for the vector embedding in multidimensional space.

12. The system of claim 1, wherein determining the characteristic of potential fraud is further based on metadata associated with the vector embedding.

13. The system of claim 1, wherein determining the characteristic of potential fraud is further based on contextual data associated with identity verification data received during the identity verification process.

14. The system of claim 4, wherein the operations further comprise:
applies a clustering algorithm to refine embeddings retrieved from the comparison between the vector embedding with the first index and the second index, the clustering algorithm grouping embeddings into clusters based on their spatial proximity in the multidimensional space such that embeddings within a cluster have higher similarity to each other than embeddings in different clusters, wherein determining the characteristic of potential fraud is based on the clusters.

15. The system of claim 1, wherein the comparing of the vector embedding with the second index is in response to an identification of a match between the vector embedding with an embedding in the first index.

16. The system of claim 1, wherein determining the characteristic of potential fraud includes:
cross-referencing metadata associated with the matched embeddings that includes personal identifiable information (PII) data to identify inconsistencies or suspicious patterns indicative of the characteristic of potential fraud.

17. The system of claim 16, wherein PII data linked to the embeddings is stored in a separate database from the database storing the embeddings.

18. The system of claim 16, wherein the PII is stored in a non-vector database that is separate from a vector database storing the vector embeddings.

19. The system of claim 16, wherein the PII is stored in the same database as the vector embeddings.

20. The system of claim 1, the operations further comprise:
receiving Personally Identifiable Information (PII) associated with the user; and
comparing the PII of the user with PII associated with embeddings of the first and second indexes,
wherein determining the characteristic of potential fraud is further based on the comparison between the PII of the user with PII associated with the embeddings of the first and second indexes.

21. The system of claim 1, wherein the likelihood of fraud is determined on the basis of detecting discrepancies within PII associated with the vector embedding and PII associated with at least one vector embeddings of the first and second indexes.

22. The system of claim 12, wherein comparing the vector embedding with the at least two embedding repositories is performed by a vector database management sub-system, wherein the operations further comprise in response to finding similar vector embeddings as a result of the comparison, transmitting metadata associated with the vector embeddings to the user.

23. A method comprising:
receiving an image of a user for an identity verification process of the user;
generating a vector embedding for or more visual features of an individual within the image using a machine learning model, the vector embedding representing the image as at least a point in a multidimensional space;
comparing the vector embedding with at least two embedding repositories to determine a likelihood of fraud by:
comparing the vector embedding with a first index of embeddings, the first index being updated at a first time interval;
comparing the vector embedding with a second index of embeddings, the second index being updated at a second time interval, the first index and second index having at least a subset of the same points in the multidimensional space; and
determining a characteristic of potential fraud based on the comparison of the vector embeddings with the first index and second index; and
outputting an identity verification result based on the likelihood of fraud,
wherein the vector embedding represents the one or more visual features of the individual as a single point in a multidimensional space, the point corresponding to a unique numerical representation of facial features of the one or more visual features of the individual, wherein the comparing of the vector embedding with the first and second index of embeddings comprises comparing the unique numerical representation of the facial features of the vector embedding with unique numerical representations of the facial features in the first and second index.

24. A non-transitory computer-readable storage medium storing instructions that, when executed by at least one processor, cause the at least one processor to perform operations comprising:
  receiving an image of a user for an identity verification process of the user;
  generating a vector embedding for one or more visual features of an individual within the image using a machine learning model, the vector embedding representing the image as at least a point in a multidimensional space;
  comparing the vector embedding with at least two embedding repositories to determine a likelihood of fraud by:
    comparing the vector embedding with a first index of embeddings, the first index being updated at a first time interval;
    comparing the vector embedding with a second index of embeddings, the second index being updated at a second time interval, the first index and second index having at least a subset of the same points in the multidimensional space; and
  determining a characteristic of potential fraud based on the comparison of the vector embeddings with the first index and second index; and
  outputting an identity verification result based on the likelihood of fraud,
  wherein the vector embedding represents the one or more visual features of the individual as a single point in a multidimensional space, the point corresponding to a unique numerical representation of facial features of the one or more visual features of the individual, wherein the comparing of the vector embedding with the first and second index of embeddings comprises comparing the unique numerical representation of the facial features of the vector embedding with unique numerical representations of the facial features in the first and second index.

25. The system of claim 1, wherein the one or more visual features of the individual includes a face of the individual.

* * * * *